US012731591B2

(12) United States Patent
Ravelli et al.

(10) Patent No.: US 12,731,591 B2
(45) **Date of Patent: *Sep. 8, 2026**

(54) APPARATUS AND METHOD FOR MDCT M/S STEREO WITH GLOBAL ILD WITH IMPROVED MID/SIDE DECISION

(71) Applicant: Fraunhofer-Gesellschaft zur Foerderung der angewandten Forschung e.V., Munich (DE)

(72) Inventors: Emmanuel Ravelli, Erlangen (DE); Markus Schnell, Nuremberg (DE); Stefan Doehla, Erlangen (DE); Wolfgang Jaegers, Erlangen (DE); Martin Dietz, Nuremberg (DE); Christian Helmrich, Berlin (DE); Goran Markovic, Nuremberg (DE); Eleni Fotopoulou, Nuremberg (DE); Markus Multrus, Nuremberg (DE); Stefan Bayer, Nuremberg (DE); Guillaume Fuchs, Bubenreuth (DE); Juergen Herre, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 249 days.

This patent is subject to a terminal disclaimer.

(21) Appl. No.: 18/497,703

(22) Filed: Oct. 30, 2023

(65) Prior Publication Data

US 2024/0071395 A1 Feb. 29, 2024

Related U.S. Application Data

(63) Continuation of application No. 16/041,691, filed on Jul. 20, 2018, now Pat. No. 11,842,742, which is a (Continued)

(30) Foreign Application Priority Data

Jan. 22, 2016 (EP) ..................................... 16152454
Jan. 22, 2016 (EP) ..................................... 16152457
Nov. 21, 2016 (EP) ..................................... 16199895

(51) Int. Cl.
*G10L 19/008* (2013.01)
*G10L 19/02* (2013.01)
(Continued)

(52) U.S. Cl.
CPC ............ *G10L 19/008* (2013.01); *G10L 19/03* (2013.01); *G10L 19/032* (2013.01);
(Continued)

(58) Field of Classification Search
None
See application file for complete search history.

(56) References Cited

U.S. PATENT DOCUMENTS 6,341,165 B1 1/2002 Gbur et al.
6,370,502 B1 * 4/2002 Wu ......................... G10L 19/00 704/E19.02
(Continued)

FOREIGN PATENT DOCUMENTS

CA 2793140 A1 10/2011
CN 1926610 A 3/2007
(Continued)

OTHER PUBLICATIONS

Valin et al., “High-Quality, Low-Delay Music Coding in the Opus Codec,” in Proc. AES 135th Convention, New York, 2013 (Year: 2013).*
(Continued)

*Primary Examiner* — Michelle M Koeth
(74) *Attorney, Agent, or Firm* — Ashurst Perkins Coie US LLP; Michael A. Glenn

(57) ABSTRACT

An apparatus for encoding a first channel and a second channel of an audio input signal including two or more channels to obtain an encoded audio signal according to an embodiment includes a normalizer configured to determine a normalization value for the audio input signal depending on the first channel of the audio input signal and depending on the second channel of the audio input signal. Moreover, the apparatus includes an encoding unit configured to generate a processed audio signal having a first channel and a second channel. The encoding unit is configured to encode
(Continued)

the processed audio signal to obtain the encoded audio signal.

40 Claims, 17 Drawing Sheets

Related U.S. Application Data continuation of application No. PCT/EP2017/051177, filed on Jan. 20, 2017.

(51) Int. Cl.
*G10L 19/03* (2013.01)
*G10L 19/032* (2013.01)
*G10L 19/22* (2013.01)

(52) U.S. Cl.
CPC ...... *G10L 19/0204* (2013.01); *G10L 19/0212* (2013.01); *G10L 19/22* (2013.01)

(56) References Cited

U.S. PATENT DOCUMENTS

| | | | | |
|---|---|---|---|---|
| 8,655,770 | B2 | 2/2014 | Tucker et al. | |
| 11,842,742 | B2 * | 12/2023 | Ravelli | G10L 19/03 |
| 2003/0091194 | A1 | 5/2003 | Teichmann et al. | |
| 2007/0208565 | A1 | 9/2007 | Lakaniemi et al. | |
| 2008/0071549 | A1 | 3/2008 | Chong et al. | |
| 2009/0228285 | A1 | 9/2009 | Schnell et al. | |
| 2010/0262420 | A1 * | 10/2010 | Herre | G10L 19/20 704/201 |
| 2011/0200198 | A1 | 8/2011 | Grill et al. | |
| 2012/0002818 | A1 | 1/2012 | Heiko et al. | |
| 2012/0275604 | A1 | 11/2012 | Vos | |
| 2013/0028426 | A1 * | 1/2013 | Purnhagen | G10L 19/167 381/23 |
| 2013/0030817 | A1 | 1/2013 | Purnhagen et al. | |
| 2013/0030819 | A1 | 1/2013 | Purnhagen et al. | |
| 2013/0266145 | A1 | 10/2013 | Purnhagen et al. | |
| 2013/0332153 | A1 * | 12/2013 | Markovic | G10L 25/78 704/219 |
| 2015/0287417 | A1 | 10/2015 | Disch et al. | |
| 2015/0380001 | A1 | 12/2015 | Purnhagen et al. | |
| 2016/0027447 | A1 | 1/2016 | Dickins et al. | |
| 2017/0134873 | A1 * | 5/2017 | Beack | G10L 19/008 |

FOREIGN PATENT DOCUMENTS

| | | | |
|---|---|---|---|
| CN | 1981326 | A | 6/2007 |
| CN | 102016985 | A | 4/2011 |
| CN | 102124517 | A | 7/2011 |
| CN | 102884570 | A | 1/2013 |
| CN | 103119647 | A | 5/2013 |
| CN | 104050969 | A | 9/2014 |
| CN | 105023578 | A | 11/2015 |
| EP | 2830054 | A1 | 1/2015 |
| EP | 2830064 | A1 | 1/2015 |
| EP | 2676266 | B1 | 3/2015 |
| JP | H08095599 | A | 4/1996 |
| JP | 2010530079 | A | 9/2010 |
| JP | 2012521012 | A | 9/2012 |
| JP | 2013524281 | A | 6/2013 |
| JP | 2014510306 | A | 4/2014 |
| JP | 2015535620 | A | 12/2015 |
| KR | 20130095851 | | 2/2015 |
| RU | 2559899 | C2 | 8/2015 |
| WO | 2008065487 | A1 | 6/2008 |
| WO | 2011/124609 | A1 | 10/2011 |
| WO | 2011124608 | A1 | 10/2011 |
| WO | 2012121637 | A1 | 9/2012 |
| WO | 2014147441 | A1 | 9/2014 |
| WO | 2015010947 | A1 | 1/2015 |
| WO | 2017087073 | A1 | 5/2017 |
| WO | 2017106041 | A1 | 6/2017 |

OTHER PUBLICATIONS

Valin, Jean-Marc , et al.. , “Opus Codec Overview”. Definition of the Opus Audio Codec. doi: 10.17487/RFC6716. Issn 2070- 1721. RFC 6716. 2012 (Year: 2012).*

Draft International Standard ISO/IEC DIS 23008-3. ISO/IEC JTC 1/SC 29/WG 11, Jul. 25, 2014, 2014.

ETSI TS 103 190-2 V1.1.1, Digital Audio Compression (AC-4) Standard Part 2: Immersive and personalized audio, Sep. 2015, 2015.

“Codec for Enhanced Voice Services (EVS)”, Detailed algorithmic description, V 12.50.0, Dec. 2015, Dec. 2005.

“Information Technology—Coding of Moving Pictures and Associate Audio for Digital Storage Media at Up to About 1.5Mbit/s—Part 3”, ISO/IEC 11172-3, 1993.

Elder, Bernd , et al., “Audio Coding Using a Psychoacoustic Pre- and Post-Filter”, Acoustics, Speech, and Signal Processing, 2000. ICASSP ’00.

Helmrich, Christian R, et al., “Efficient Transform Coding of Two-Channel Audio Signals by Means of Complex-Valued Stereo Prediction”, Acoustics, Speech and Signal Processing (ICASSP), 2011 IEEE International Conference on, Prague., 2011.

Helmrich, Christian R, et al., “Low-complexity semi-parametric joint-stereo audio transform coding”, 23rd European Signal Processing Conference (EUSIPCO), EURASIP, pp. 794-798, XP032836448, 2015.

Helmrich, Christian R, et al., “Low-Complexity Semi-Parametric Joint-Stereo Audio Transform Coding”, Signal Processing Conference (EUSIPCO), 23rd European Signal Processing Conference (EUSIPCO), EURASIP, XP032836448, Aug. 31, 2015, 794-798.

Herre, Jurgen , et al., “Combined Stereo Coding”, 93rd AES Convention, San Francisco, 1992; convention papers 3369, 3369.

ISO/IEC 11172-3 , “Information technology—Coding of moving pictures and associate audio for digital storage media at up to about 1,5 Mbit/s”, Part 3: Audio, Jan. 8, 1993.

ISO/IEC 13818-7 , “Information Technology—Generic Coding of Moving Pictures and Associated Audio Information”, ISO/IEC 13818-7. Advanced Audio Coding (AAC)., 2003.

Johnston, J D, et al., “Sum-Difference Stereo Transform Coding”, Proc. ICASSP, 1992., 1992.

Lindblom, J , et al., “Flexible sum-difference stereo coding based on time-aligned signal components”, Applications of Signal Processing to Audio and Acoustics, 2005. IEEE Workshop on New Paltz, NY, USA Oct. 16-19, 2005, pp. 255-258, XP010854377.

Malvar, Henrique , et al., “A Modulated Complex Lapped Transform and its Applications to Audio Processing”, Acoustics, Speech, and Signal Processing (ICASSP), 1999. Proceedings., 1999 IEEE International Conference on, Phoenix, AZ, 1999.

Valin, Jean-Marc , et al., “”, Valin, Jean-Marc; Vos, Koen; Terriberry, Timothy B. (Sep. 11, 2012). “Opus Codec Overview”. Definition of the Opus Audio Codec. p. 8. sec. 2. doi:10.17487/RFC6716. ISSN 2070-1721. RFC 6716. (Year: 2012), 2012.

Valin, Jean-Marc , et al., “High-Quality, Low-Delay Music Coding in the Opus Codec”, Proc. AES 135th Convention, New York.

Liu Dongbing, Du Weitao, Yang Zhanxin; Brief Analysis of Spectral Band Replication Technology in Audio Coding, Journal of Liaoning University (Natural Science Edition), No. 04, Nov. 15, 2011—4 pp.

Zeng Min, Tu WeiPing, Cai XuFen; Design and Implementation of Parametric Stereo Encoder in MDFT, Computer Engineering and Applications, No. 13, May 12, 2015—7 pp.

* cited by examiner

APPARATUS AND METHOD FOR MDCT M/S STEREO WITH GLOBAL ILD WITH IMPROVED MID/SIDE DECISION

CROSS-REFERENCES TO RELATED APPLICATIONS

This application is a continuation of U.S. patent application Ser. No. 16/041,691, filed Jul. 20, 2018, which is a continuation of copending International Application No. PCT/EP2017/051177, filed Jan. 20, 2017, which is incorporated herein by reference in its entirety, and additionally claims priority from European Applications Nos. EP 16152457.4, filed Jan. 22, 2016, EP 16152454.1, filed Jan. 22, 2016, and EP 16199895.0, filed Nov. 21, 2016, all of which are incorporated herein by reference in their entirety.

The present invention relates to audio signal encoding and audio signal decoding and, in particular, to an apparatus and method for MDCT M/S Stereo with Global ILD with improved Mid/Side Detection.

BACKGROUND OF THE INVENTION

Band-wise M/S processing (M/S=Mid/Side) in MDCT-based coders (MDCT=Modified Discrete Cosine Transform) is a known and effective method for stereo processing. Yet, it is not sufficient for panned signals, and an additional processing, such as complex prediction or a coding of angles between a mid and a side channel, may be used.

In [1], [2], [3] and [4], M/S processing on windowed and transformed non-normalized (not whitened) signals is described.

In [7], prediction between mid and side channels is described. In [7], an encoder is disclosed which encodes an audio signal based on a combination of two audio channels. The audio encoder obtains a combination signal being a mid-signal; and further obtains a prediction residual signal being a predicted side signal derived from the mid signal. The first combination signal and the prediction residual signal are encoded and written into a data stream together with the prediction information. Moreover, [7] discloses a decoder which generates decoded first and second audio channels using the prediction residual signal, the first combination signal and the prediction information.

In [5], the application of M/S stereo coupling after normalization separately on each band is described. In particular, [5] refers to the Opus codec. Opus encodes the mid signal and side signal as normalized signals $m=M/||M||$ and $s=s/||s||$. To recover M and S from m and s, the angle $\theta_s=\arctan(||S||/||M||)$ is encoded. With N being the size of the band and with a being the total number of bits available for m and s, the optimal allocation for m is $a_{mid}=(a-(N-1)\log_2 \tan \theta_s)/2$.

In known approaches (e.g in [2] and [4]), complicated rate/distortion loops are combined with the decision in which bands channels are to be transformed (e.g., using M/S, which also may be followed by M to S prediction residual calculation from [7]), in order to reduce the correlation between channels. This complicated structure has high computational cost. Separating the perceptual model from the rate loop (as in [6a], [6b] and [13]) significantly simplifies the system.

Also, coding of the prediction coefficients or angles in each band involves a significant number of bits (as for example in [5] and [7]).

In [1], [3] and [5] only single decision over the whole spectrum is carried out to decide if the whole spectrum should be M/S or UR coded.

M/S coding is not efficient, if an ILD (interaural level difference) exists, that is, if channels are panned.

As outlined above, it is known that band-wise M/S processing in MDCT-based coders is an effective method for stereo processing. The M/S processing coding gain varies from 0% for uncorrelated channels to 50% for monophonic or for a $\pi/2$ phase difference between the channels. Due to the stereo unmasking and inverse unmasking (see [1]), it is important to have a robust M/S decision.

In [2], each band, where masking thresholds between left and right vary by less than 2 dB, M/S coding is chosen as coding method.

In [1], the M/S decision is based on the estimated bit consumption for M/S coding and for L/R coding (L/R=left/right) of the channels. The bitrate demand for M/S coding and for L/R coding is estimated from the spectra and from the masking thresholds using perceptual entropy (PE). Masking thresholds are calculated for the left and the right channel. Masking thresholds for the mid channel and for the side channel are assumed to be the minimum of the left and the right thresholds.

Moreover, [1] describes how coding thresholds of the individual channels to be encoded are derived. Specifically, the coding thresholds for the left and the right channels are calculated by the respective perceptual models for these channels. In [1], the coding thresholds for the M channel and the S channel are chosen equally and are derived as the minimum of the left and the right coding thresholds.

Moreover, [1] describes deciding between L/R coding and M/S coding such that a good coding performance is achieved. Specifically, a perceptual entropy is estimated for the UR encoding and M/S encoding using the thresholds.

In [1] and [2], as well as in [3] and [4], M/S processing is conducted on windowed and transformed non-normalized (not whitened) signal and the M/S decision is based on the masking threshold and the perceptual entropy estimation.

In [5], an energy of the left channel and the right channel are explicitly coded and the coded angle preserves the energy of the difference signal. It is assumed in [5] that M/S coding is safe, even if L/R coding is more efficient. According to [5], UR coding is only chosen when the correlation between the channels is not strong enough.

Furthermore, coding of the prediction coefficients or angles in each band involves a significant number of bits (see, for example, [5] and [7]).

SUMMARY

According to an embodiment, an apparatus for encoding a first channel and a second channel of an audio input signal having two or more channels to obtain an encoded audio signal may have: a normalizer configured to determine a normalization value for the audio input signal depending on the first channel of the audio input signal and depending on the second channel of the audio input signal, wherein the normalizer is configured to determine a first channel and a second channel of a normalized audio signal by modifying, depending on the normalization value, at least one of the first channel and the second channel of the audio input signal, an encoding unit being configured to generate a processed audio signal having a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal depending on a spectral band of the first channel of the normalized audio signal and depending on a spectral band of the second channel of the normalized audio signal, and such that at least one spectral band of the second channel of the processed audio signal is a spectral band of a side signal depending on a spectral band of the first channel of the normalized audio signal and depending on a spectral band of the second channel of the normalized audio signal, wherein the encoding unit is configured to encode the processed audio signal to obtain the encoded audio signal.

According to another embodiment, a system for encoding four channels of an audio input signal having four or more channels to obtain an encoded audio signal may have: a first inventive apparatus for encoding a first channel and a second channel of the four or more channels of the audio input signal to obtain a first channel and a second channel of the encoded audio signal, and a second inventive apparatus for encoding a third channel and a fourth channel of the four or more channels of the audio input signal to obtain a third channel and a fourth channel of the encoded audio signal.

Another embodiment may have an apparatus for decoding an encoded audio signal having a first channel and a second channel to obtain a first channel and a second channel of a decoded audio signal having two or more channels, wherein the apparatus has a decoding unit configured to determine for each spectral band of a plurality of spectral bands, whether said spectral band of the first channel of the encoded audio signal and said spectral band of the second channel of the encoded audio signal was encoded using dual-mono encoding or using mid-side encoding, wherein the decoding unit is configured to use said spectral band of the first channel of the encoded audio signal as a spectral band of a first channel of an intermediate audio signal and is configured to use said spectral band of the second channel of the encoded audio signal as a spectral band of a second channel of the intermediate audio signal, if the dual-mono encoding was used, wherein the decoding unit is configured to generate a spectral band of the first channel of the intermediate audio signal based on said spectral band of the first channel of the encoded audio signal and based on said spectral band of the second channel of the encoded audio signal, and to generate a spectral band of the second channel of the intermediate audio signal based on said spectral band of the first channel of the encoded audio signal and based on said spectral band of the second channel of the encoded audio signal, if the mid-side encoding was used, and wherein the apparatus has a de-normalizer configured to modify, depending on a de-normalization value, at least one of the first channel and the second channel of the intermediate audio signal to obtain the first channel and the second channel of the decoded audio signal.

According to another embodiment, a system for decoding an encoded audio signal having four or more channels to obtain four channels of a decoded audio signal having four or more channels may have: a first inventive apparatus for decoding a first channel and a second channel of the four or more channels of the encoded audio signal to obtain a first channel and a second channel of the decoded audio signal, and a second inventive apparatus for decoding a third channel and a fourth channel of the four or more channels of the encoded audio signal to obtain a third channel and a fourth channel of the decoded audio signal.

According to another embodiment, a system for generating an encoded audio signal from an audio input signal and for generating a decoded audio signal from the encoded audio signal may have: an inventive apparatus configured to generate the encoded audio signal from the audio input signal, and an inventive apparatus configured to generate the decoded audio signal from the encoded audio signal.

According to another embodiment, a system for generating an encoded audio signal from an audio input signal and for generating a decoded audio signal from the encoded audio signal may have: an inventive system configured to generate the encoded audio signal from the audio input signal, and an inventive system configured to generate the decoded audio signal from the encoded audio signal.

According to another embodiment, a method for encoding a first channel and a second channel of an audio input signal having two or more channels to obtain an encoded audio signal may have the steps of: determining a normalization value for the audio input signal depending on the first channel of the audio input signal and depending on the second channel of the audio input signal, determining a first channel and a second channel of a normalized audio signal by modifying, depending on the normalization value, at least one of the first channel and the second channel of the audio input signal, generating a processed audio signal having a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal depending on a spectral band of the first channel of the normalized audio signal and depending on a spectral band of the second channel of the normalized audio signal, and such that at least one spectral band of the second channel of the processed audio signal is a spectral band of a side signal depending on a spectral band of the first channel of the normalized audio signal and depending on a spectral band of the second channel of the normalized audio signal, and encoding the processed audio signal to obtain the encoded audio signal.

According to another embodiment, a method for decoding an encoded audio signal having a first channel and a second channel to obtain a first channel and a second channel of a decoded audio signal having two or more channels may have the steps of: determining for each spectral band of a plurality of spectral bands, whether said spectral band of the first channel of the encoded audio signal and said spectral band of the second channel of the encoded audio signal was encoded using dual-mono encoding or using mid-side encoding, using said spectral band of the first channel of the encoded audio signal as a spectral band of a first channel of an intermediate audio signal and using said spectral band of the second channel of the encoded audio signal as a spectral band of a second channel of the intermediate audio signal, if dual-mono encoding was used, generating a spectral band of the first channel of the intermediate audio signal based on said spectral band of the first channel of the encoded audio signal and based on said spectral band of the second channel of the encoded audio signal, and generating a spectral band of the second channel of the intermediate audio signal based on said spectral band of the first channel of the encoded audio signal and based on said spectral band of the second channel of the encoded audio signal, if mid-side encoding was used, and modifying, depending on a de-normalization value, at least one of the first channel and the second channel of the intermediate audio signal to obtain the first channel and the second channel of a decoded audio signal.

Another embodiment may have a non-transitory digital storage medium having a computer program stored thereon to perform the inventive methods when said computer program is run by a computer or signal processor.

According to an embodiment, an apparatus for encoding a first channel and a second channel of an audio input signal comprising two or more channels to obtain an encoded audio signal is provided.

The apparatus for encoding comprises a normalizer configured to determine a normalization value for the audio input signal depending on the first channel of the audio input signal and depending on the second channel of the audio input signal, wherein the normalizer is configured to determine a first channel and a second channel of a normalized audio signal by modifying, depending on the normalization value, at least one of the first channel and the second channel of the audio input signal.

Moreover, the apparatus for encoding comprises an encoding unit being configured to generate a processed audio signal having a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal depending on a spectral band of the first channel of the normalized audio signal and depending on a spectral band of the second channel of the normalized audio signal, and such that at least one spectral band of the second channel of the processed audio signal is a spectral band of a side signal depending on a spectral band of the first channel of the normalized audio signal and depending on a spectral band of the second channel of the normalized audio signal. The encoding unit is configured to encode the processed audio signal to obtain the encoded audio signal.

Moreover, an apparatus for decoding an encoded audio signal comprising a first channel and a second channel to obtain a first channel and a second channel of a decoded audio signal comprising two or more channels is provided.

The apparatus for decoding comprises a decoding unit configured to determine for each spectral band of a plurality of spectral bands, whether said spectral band of the first channel of the encoded audio signal and said spectral band of the second channel of the encoded audio signal was encoded using dual-mono encoding or using mid-side encoding.

The decoding unit is configured to use said spectral band of the first channel of the encoded audio signal as a spectral band of a first channel of an intermediate audio signal and is configured to use said spectral band of the second channel of the encoded audio signal as a spectral band of a second channel of the intermediate audio signal, if the dual-mono encoding was used.

Moreover, the decoding unit is configured to generate a spectral band of the first channel of the intermediate audio signal based on said spectral band of the first channel of the encoded audio signal and based on said spectral band of the second channel of the encoded audio signal, and to generate a spectral band of the second channel of the intermediate audio signal based on said spectral band of the first channel of the encoded audio signal and based on said spectral band of the second channel of the encoded audio signal, if the mid-side encoding was used.

Furthermore, the apparatus for decoding comprises a de-normalizer configured to modify, depending on a de-normalization value, at least one of the first channel and the second channel of the intermediate audio signal to obtain the first channel and the second channel of the decoded audio signal.

Moreover, a method for encoding a first channel and a second channel of an audio input signal comprising two or more channels to obtain an encoded audio signal is provided. The method comprises:

Determining a normalization value for the audio input signal depending on the first channel of the audio input signal and depending on the second channel of the audio input signal.

Determining a first channel and a second channel of a normalized audio signal by modifying, depending on the normalization value, at least one of the first channel and the second channel of the audio input signal.

Generate a processed audio signal having a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal depending on a spectral band of the first channel of the normalized audio signal and depending on a spectral band of the second channel of the normalized audio signal, and such that at least one spectral band of the second channel of the processed audio signal is a spectral band of a side signal depending on a spectral band of the first channel of the normalized audio signal and depending on a spectral band of the second channel of the normalized audio signal, and encoding the processed audio signal to obtain the encoded audio signal.

Furthermore, a method for decoding an encoded audio signal comprising a first channel and a second channel to obtain a first channel and a second channel of a decoded audio signal comprising two or more channels is provided. The method comprises:

Determining for each spectral band of a plurality of spectral bands, whether said spectral band of the first channel of the encoded audio signal and said spectral band of the second channel of the encoded audio signal was encoded using dual-mono encoding or using mid-side encoding.

Using said spectral band of the first channel of the encoded audio signal as a spectral band of a first channel of an intermediate audio signal and using said spectral band of the second channel of the encoded audio signal as a spectral band of a second channel of the intermediate audio signal, if the dual-mono encoding was used.

Generating a spectral band of the first channel of the intermediate audio signal based on said spectral band of the first channel of the encoded audio signal and based on said spectral band of the second channel of the encoded audio signal, and generating a spectral band of the second channel of the intermediate audio signal based on said spectral band of the first channel of the encoded audio signal and based on said spectral band of the second channel of the encoded audio signal, if the mid-side encoding was used. And:

Modifying, depending on a de-normalization value, at least one of the first channel and the second channel of the intermediate audio signal to obtain the first channel and the second channel of a decoded audio signal.

Moreover, computer programs are provided, wherein each of the computer programs is configured to implement one of the above-described methods when being executed on a computer or signal processor.

According to embodiments, new concepts are provided that are able to deal with panned signals using minimal side information.

According to some embodiments, FDNS (FDNS=Frequency Domain Noise Shaping) with the rate-loop is used as described in [6a] and [6b] combined with the spectral envelope warping as described in [8]. In some embodiments, a single ILD parameter on the FDNS-whitened spectrum is used followed by the band-wise decision, whether M/S coding or L/R coding is used for coding. In some embodiments, the M/S decision is based on the estimated bit saving. In some embodiments, bitrate distribution among the band-wise M/S processed channels may, e.g., depend on energy.

Some embodiments provide a combination of single global ILD applied on the whitened spectrum, followed by the band-wise M/S processing with an efficient M/S decision mechanism and with a rate-loop that controls the one single global gain.

Some embodiments inter alia employ FDNS with rate-loop, for example, based on [6a] or [6b], combined with the spectral envelope warping, for example based on [8]. These embodiments provide an efficient and very effective way for separating perceptual shaping of quantization noise and rate-loop. Using the single ILD parameter on the FDNS-whitened spectrum allows simple and effective way of deciding if there is an advantage of M/S processing as described above. Whitening the spectrum and removing the ILD allows efficient M/S processing. Coding single global ILD for the described system is enough and thus bit saving is achieved in contrast to known approaches.

According to embodiments, the M/S processing is done based on a perceptually whitened signal. Embodiments determine coding thresholds and determine, in an optimal manner, a decision, whether an L/R coding or a M/S coding is employed, when processing perceptually whitened and ILD compensated signals.

Moreover, according to embodiments, a new bitrate estimation is provided.

In contrast to [1]-[5], in embodiments, the perceptual model is separated from the rate loop as in [6a], [6b] and [13].

Even though the M/S decision is based on the estimated bitrate as proposed in [1], in contrast to [1] the difference in the bitrate demand of the M/S and the L/R coding is not dependent on the masking thresholds determined by a perceptual model. Instead the bitrate demand is determined by a lossless entropy coder being used. In other words: instead of deriving the bitrate demand from the perceptual entropy of the original signal, the bitrate demand is derived from the entropy of the perceptually whitened signal.

In contrast to [1]-[5], in embodiments, the M/S decision is determined based on a perceptually whitened signal, and a better estimate of the bitrate that may be used is obtained. For this purpose, the arithmetic coder bit consumption estimation as described in [6a] or [6b] may be applied. Masking thresholds do not have to be explicitly considered.

In [1], the masking thresholds for the mid and the side channels are assumed to be the minimum of the left and the right masking thresholds. Spectral noise shaping is done on the mid and the side channel and may, e.g., be based on these masking thresholds.

According to embodiments, spectral noise shaping may, e.g., be conducted on the left and the right channel, and the perceptual envelope may, in such embodiments, be exactly applied where it was estimated.

Furthermore, embodiments are based on the finding that M/S coding is not efficient if ILD exists, that is, if channels are panned. To avoid this, embodiments use a single ILD parameter on the perceptually whitened spectrum.

According to some embodiments, new concepts for the M/S decision are provided that process a perceptually whitened signal.

According to some embodiments, the codec uses new concepts that were not part of classic audio codecs, e.g., as described in [1].

According to some embodiments, perceptually whitened signals are used for further coding, e.g., similar to the way they are used in a speech coder.

Such an approach has several advantages, e.g., the codec architecture is simplified, a compact representation of the noise shaping characteristics and the masking threshold is achieved, e.g., as LPC coefficients. Moreover, transform and speech codec architectures are unified and thus a combined audio/speech coding is enabled.

Some embodiments employ a global ILD parameter to efficiently code panned sources.

In embodiments, the codec employs Frequency Domain Noise Shaping (FDNS) to perceptually whiten the signal with the rate-loop, for example, as described in [6a] or [6b] combined with the spectral envelope warping as described in [8]. In such embodiments, the codec may, e.g., further use a single ILD parameter on the FDNS-whitened spectrum followed by the band-wise M/S vs UR decision. The band-wise M/S decision may, e.g., be based on the estimated bitrate in each band when coded in the L/R and in the M/S mode. The mode with least required bits is chosen. Bitrate distribution among the band-wise M/S processed channels is based on the energy.

Some embodiments apply a band-wise M/S decision on a perceptually whitened and ILD compensated spectrum using the per band estimated number of bits for an entropy coder.

In some embodiments, FDNS with the rate-loop, for example, as described in [6a] or [6b] combined with the spectral envelope warping as described in [8], is employed. This provides an efficient, very effective way separating perceptual shaping of quantization noise and rate-loop. Using the single ILD parameter on the FDNS-whitened spectrum allows simple and effective way of deciding if there is an advantage of M/S processing as described. Whitening the spectrum and removing the ILD allows efficient M/S processing. Coding single global ILD for the described system is enough and thus bit saving is achieved in contrast to known approaches.

Embodiments modify the concepts provided in [1] when processing perceptually whitened and ILD compensated signals. In particular, embodiments employ an equal global gain for L, R, M and S, that together with the FDNS forms the coding thresholds. The global gain may be derived from an SNR estimation or from some other concept.

The proposed band-wise M/S decision precisely estimates the number of bits that may be used for coding each band with the arithmetic coder. This is possible because the M/S decision is done on the whitened spectrum and directly followed by the quantization.

There is no need for experimental search for thresholds.

BRIEF DESCRIPTION OF THE DRAWINGS

Embodiments of the present invention will be detailed subsequently referring to the appended drawings, in which:

FIG. 1*f* illustrates a system for decoding an encoded audio signal comprising four or more channels to obtain four channels of a decoded audio signal comprising four or more channels according to an embodiment.

DETAILED DESCRIPTION OF THE INVENTION

Figure 1A:
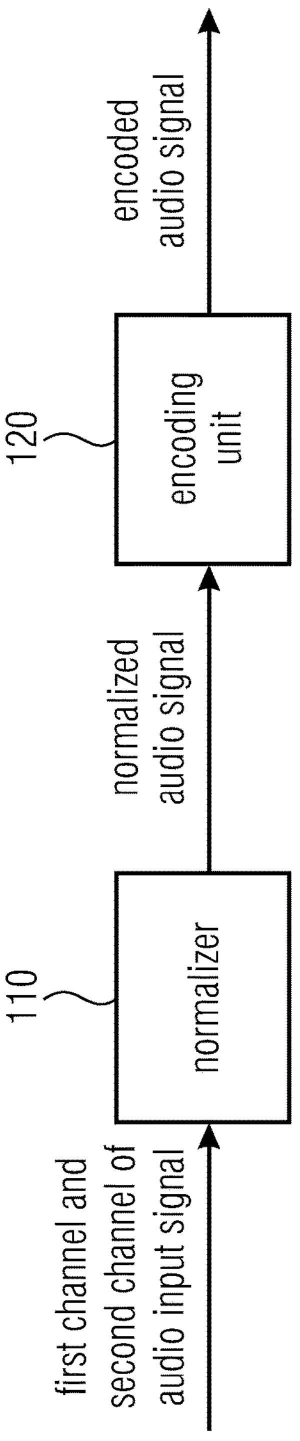
FIG. 1*a* illustrates an apparatus for encoding according to an embodiment.

FIG. 1*a* illustrates an apparatus for encoding a first channel and a second channel of an audio input signal comprising two or more channels to obtain an encoded audio signal according to an embodiment.

The apparatus comprises a normalizer 110 configured to determine a normalization value for the audio input signal depending on the first channel of the audio input signal and depending on the second channel of the audio input signal. The normalizer 110 is configured to determine a first channel and a second channel of a normalized audio signal by modifying, depending on the normalization value, at least one of the first channel and the second channel of the audio input signal.

For example, the normalizer 110 may, in an embodiment, for example, be configured to determine the normalization value for the audio input signal depending on a plurality of spectral bands the first channel and of the second channel of the audio input signal, the normalizer 110 may, e.g., be configured to determine the first channel and the second channel of the normalized audio signal by modifying, depending on the normalization value, the plurality of spectral bands of at least one of the first channel and the second channel of the audio input signal.

Or, for example, the normalizer 110 may, e.g., be configured to determine a normalization value for the audio input signal depending on the first channel of the audio input signal being represented in a time domain and depending on the second channel of the audio input signal being represented in the time domain. Moreover, the normalizer 110 is configured to determine the first channel and the second channel of the normalized audio signal by modifying, depending on the normalization value, at least one of the first channel and the second channel of the audio input signal being represented in the time domain.

The apparatus further comprises a transform unit (not shown in FIG. 1*a*) being configured to transform the normalized audio signal from the time domain to a spectral domain so that the normalized audio signal is represented in the spectral domain. The transform unit is configured to feed the normalized audio signal being represented in the spectral domain into the encoding unit 120. For example, the audio input signal may, e.g., be a time-domain residual signal that results from LPC filtering (LPC=Linear Predictive Coding) two channels of a time-domain audio signal.

Moreover, the apparatus comprises an encoding unit 120 being configured to generate a processed audio signal having a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal depending on a spectral band of the first channel of the normalized audio signal and depending on a spectral band of the second channel of the normalized audio signal, and such that at least one spectral band of the second channel of the processed audio signal is a spectral band of a side signal depending on a spectral band of the first channel of the normalized audio signal and depending on a spectral band of the second channel of the normalized audio signal. The encoding unit 120 is configured to encode the processed audio signal to obtain the encoded audio signal.

In an embodiment, the encoding unit 120 may, e.g., be configured to choose between a full-mid-side encoding mode and a full-dual-mono encoding mode and a band-wise encoding mode depending on a plurality of spectral bands of a first channel of the normalized audio signal and depending on a plurality of spectral bands of a second channel of the normalized audio signal.

In such an embodiment, the encoding unit 120 may, e.g., be configured, if the full-mid-side encoding mode is chosen, to generate a mid signal from the first channel and from the second channel of the normalized audio signal as a first channel of a mid-side signal, to generate a side signal from the first channel and from the second channel of the normalized audio signal as a second channel of the mid-side signal, and to encode the mid-side signal to obtain the encoded audio signal.

According to such an embodiment, the encoding unit 120 may, e.g., be configured, if the full-dual-mono encoding mode is chosen, to encode the normalized audio signal to obtain the encoded audio signal.

Moreover, in such an embodiment, the encoding unit 120 may, e.g., be configured, if the band-wise encoding mode is chosen, to generate the processed audio signal, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal depending on a spectral band of the first channel of the normalized audio signal and depending on a spectral band of the second channel of the normalized audio signal, and such that at least one spectral band of the second channel of the processed audio signal is a spectral band of a side signal depending on a spectral band of the first channel of the normalized audio signal and depending on a spectral band of the second channel of the normalized audio signal, wherein the encoding unit 120 may, e.g., be configured to encode the processed audio signal to obtain the encoded audio signal.

According to an embodiment, the audio input signal may, e.g., be an audio stereo signal comprising exactly two channels. For example, the first channel of the audio input signal may, e.g., be a left channel of the audio stereo signal, and the second channel of the audio input signal may, e.g., be a right channel of the audio stereo signal.

In an embodiment, the encoding unit 120 may, e.g., be configured, if the band-wise encoding mode is chosen, to decide for each spectral band of a plurality of spectral bands of the processed audio signal, whether mid-side encoding is employed or whether dual-mono encoding is employed.

If the mid-side encoding is employed for said spectral band, the encoding unit 120 may, e.g., be configured to generate said spectral band of the first channel of the processed audio signal as a spectral band of a mid signal based on said spectral band of the first channel of the normalized audio signal and based on said spectral band of the second channel of the normalized audio signal. The encoding unit 120 may, e.g., be configured to generate said spectral band of the second channel of the processed audio signal as a spectral band of a side signal based on said spectral band of the first channel of the normalized audio signal and based on said spectral band of the second channel of the normalized audio signal.

If the dual-mono encoding is employed for said spectral band, the encoding unit 120 may, e.g., be configured to use said spectral band of the first channel of the normalized audio signal as said spectral band of the first channel of the processed audio signal, and may, e.g., be configured to use said spectral band of the second channel of the normalized audio signal as said spectral band of the second channel of the processed audio signal. Or the encoding unit 120 is configured to use said spectral band of the second channel of the normalized audio signal as said spectral band of the first channel of the processed audio signal, and may, e.g., be configured to use said spectral band of the first channel of the normalized audio signal as said spectral band of the second channel of the processed audio signal.

According to an embodiment, the encoding unit 120 may, e.g., be configured to choose between the full-mid-side encoding mode and the full-dual-mono encoding mode and the band-wise encoding mode by determining a first estimation estimating a first number of bits that are needed for encoding when the full-mid-side encoding mode is employed, by determining a second estimation estimating a second number of bits that are needed for encoding when the full-dual-mono encoding mode is employed, by determining a third estimation estimating a third number of bits that are needed for encoding when the band-wise encoding mode may, e.g., be employed, and by choosing that encoding mode among the full-mid-side encoding mode and the full-dual-mono encoding mode and the band-wise encoding mode that has a smallest number of bits among the first estimation and the second estimation and the third estimation.

In an embodiment, the encoding unit 120 may, e.g., be configured to estimate the third estimation $b_{BW}$, estimating the third number of bits that are needed for encoding when the band-wise encoding mode is employed, according to the formula:

$$b_{BW} = nBands \mid \sum_{i=0}^{nBands-1} \min\left(b_{bwLR}^{i}, b_{bwMS}^{i}\right),$$

wherein nBands is a number of spectral bands of the normalized audio signal, wherein $$b_{bwMS}^{i}$$

is an estimation for a number of bits that are needed for encoding an i-th spectral band of the mid signal and for encoding the i-th spectral band of the side signal, and wherein $$b_{bwLR}^{i}$$

is an estimation for a number of bits that are needed for encoding an i-th spectral band of the first signal and for encoding the i-th spectral band of the second signal.

In embodiments, an objective quality measure for choosing between the full-mid-side encoding mode and the full-dual-mono encoding mode and the band-wise encoding mode may, e.g., be employed.

According to an embodiment, the encoding unit 120 may, e.g., be configured to choose between the full-mid-side encoding mode and the full-dual-mono encoding mode and the band-wise encoding mode by determining a first estimation estimating a first number of bits that are saved when encoding in the full-mid-side encoding mode, by determining a second estimation estimating a second number of bits that are saved when encoding in the full-dual-mono encoding mode, by determining a third estimation estimating a third number of bits that are saved when encoding in the band-wise encoding mode, and by choosing that encoding mode among the full-mid-side encoding mode and the full-dual-mono encoding mode and the band-wise encoding mode that has a greatest number of bits that are saved among the first estimation and the second estimation and the third estimation.

In another embodiment, the encoding unit 120 may, e.g., be configured to choose between the full-mid-side encoding mode and the full-dual-mono encoding mode and the band-wise encoding mode by estimating a first signal-to-noise ratio that occurs when the full-mid-side encoding mode is employed, by estimating a second signal-to-noise ratio that occurs when the full-dual-mono encoding mode is employed, by estimating a third signal-to-noise ratio that occurs when the band-wise encoding mode is employed, and by choosing that encoding mode among the full-mid-side encoding mode and the full-dual-mono encoding mode and the band-wise encoding mode that has a greatest signal-to-noise-ratio among the first signal-to-noise-ratio and the second signal-to-noise-ratio and the third signal-to-noise-ratio.

In an embodiment, the normalizer 110 may, e.g., be configured to determine the normalization value for the audio input signal depending on an energy of the first channel of the audio input signal and depending on an energy of the second channel of the audio input signal.

According to an embodiment the audio input signal may, e.g., be represented in a spectral domain. The normalizer 110 may, e.g., be configured to determine the normalization value for the audio input signal depending on a plurality of spectral bands the first channel of the audio input signal and depending on a plurality of spectral bands of the second channel of the audio input signal. Moreover, the normalizer 110 may, e.g., be configured to determine the normalized audio signal by modifying, depending on the normalization value, the plurality of spectral bands of at least one of the first channel and the second channel of the audio input signal.

In an embodiment, the normalizer 110 may, e.g., be configured to determine the normalization value based on the formulae:

$$NRG_L = \sqrt{\sum MDCT_{L,k}^2}$$

$$NRG_R = \sqrt{\sum MDCT_{R,k}^2}$$

$$ILD = \frac{NRG_L}{NRG_L + NRG_R}$$

wherein $MDCT_{L,k}$ is a k-th coefficient of an MDCT spectrum of the first channel of the audio input signal, and $MDCT_{R,k}$ is the k-th coefficient of the MDCT spectrum of the second channel of the audio input signal. The normalizer 110 may, e.g., be configured to determine the normalization value by quantizing ILD.

Figure 1B:
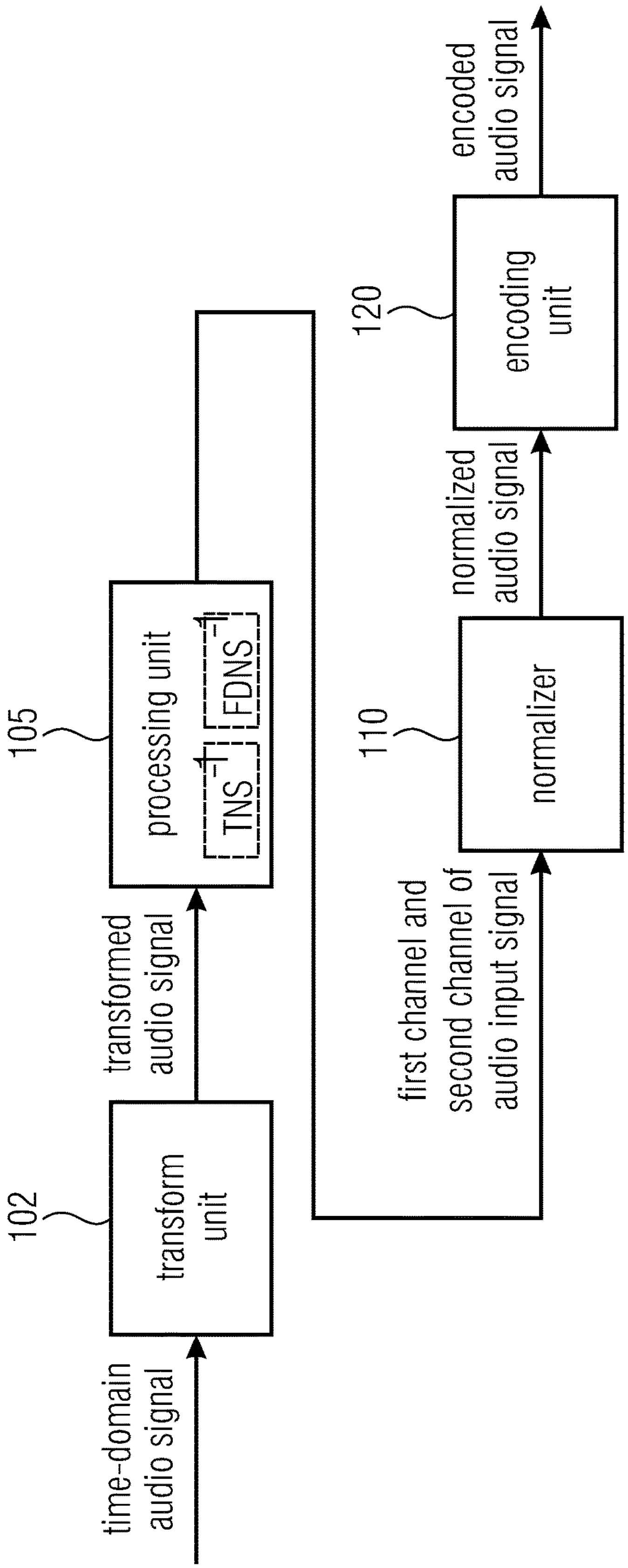
FIG. 1*b* illustrates an apparatus for encoding according to another embodiment, wherein the apparatus further comprises a transform unit and a preprocessing unit.

According to an embodiment illustrated by FIG. 1*b*, the apparatus for encoding may, e.g., further comprise a transform unit 102 and a preprocessing unit 105. The transform unit 102 may, e.g., be configured to configured to transform a time-domain audio signal from a time domain to a frequency domain to obtain a transformed audio signal. The preprocessing unit 105 may, e.g., be configured to generate the first channel and the second channel of the audio input signal by applying an encoder-side frequency domain noise shaping operation on the transformed audio signal.

In a particular embodiment, the preprocessing unit 105 may, e.g., be configured to generate the first channel and the second channel of the audio input signal by applying an encoder-side temporal noise shaping operation on the transformed audio signal before applying the encoder-side frequency domain noise shaping operation on the transformed audio signal.

Figures 1C, 1D:
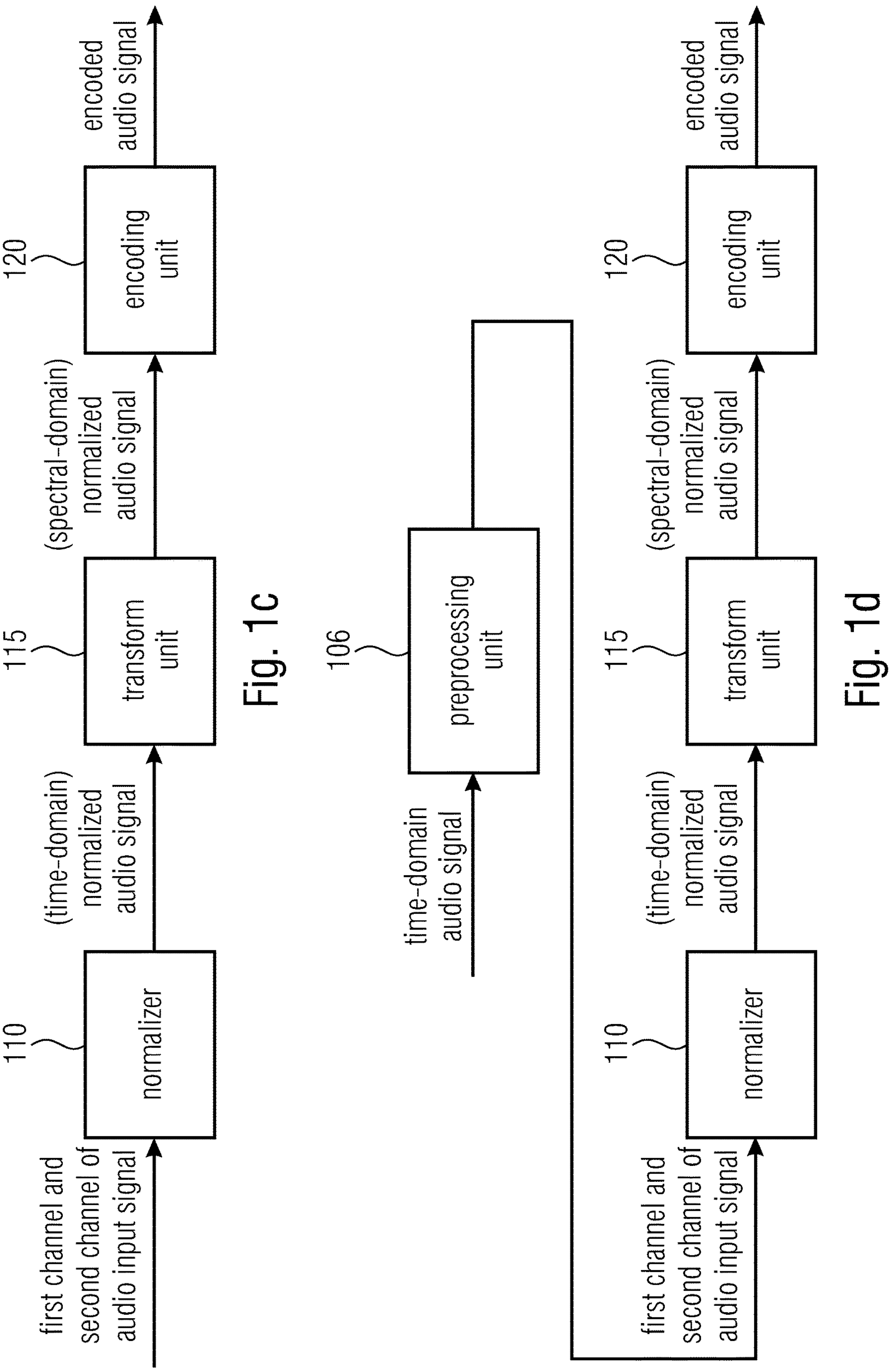
FIG. 1*c* illustrates an apparatus for encoding according to a further embodiment, wherein the apparatus further comprises a transform unit.
FIG. 1*d* illustrates an apparatus for encoding according to a further embodiment, wherein the apparatus comprises a preprocessing unit and a transform unit.

FIG. 1*c* illustrates an apparatus for encoding according to a further embodiment further comprising a transform unit 115. The normalizer 110 may, e.g., be configured to determine a normalization value for the audio input signal depending on the first channel of the audio input signal being represented in a time domain and depending on the second channel of the audio input signal being represented in the time domain. Moreover, the normalizer 110 may, e.g., be configured to determine the first channel and the second channel of the normalized audio signal by modifying, depending on the normalization value, at least one of the first channel and the second channel of the audio input signal being represented in the time domain. The transform unit 115 may, e.g., be configured to transform the normalized audio signal from the time domain to a spectral domain so that the normalized audio signal is represented in the spectral domain. Moreover, the transform unit 115 may, e.g., be configured to feed the normalized audio signal being represented in the spectral domain into the encoding unit 120.

FIG. 1*d* illustrates an apparatus for encoding according to a further embodiment, wherein the apparatus further comprises a preprocessing unit 106 being configured to receive a time-domain audio signal comprising a first channel and a second channel. The preprocessing unit 106 may, e.g., be configured to apply a filter on the first channel of the time-domain audio signal that produces a first perceptually whitened spectrum to obtain the first channel of the audio input signal being represented in the time domain. Moreover, the preprocessing unit 106 may, e.g., be configured to apply the filter on the second channel of the time-domain audio signal that produces a second perceptually whitened spectrum to obtain the second channel of the audio input signal being represented in the time domain.

Figure 1E:
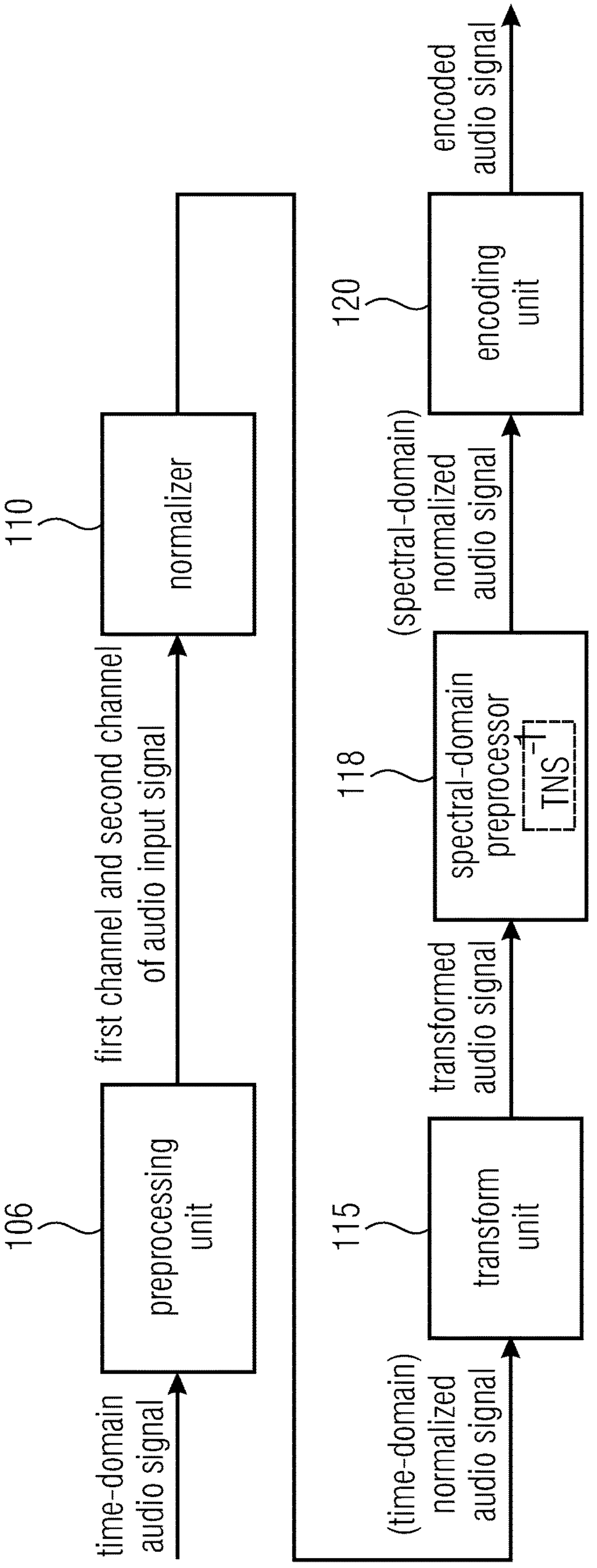
FIG. 1*e* illustrates an apparatus for encoding according to a further embodiment, wherein the apparatus furthermore comprises a spectral-domain preprocessor.

In an embodiment, illustrated by FIG. 1*e*, the transform unit 115 may, e.g., be configured to transform the normalized audio signal from the time domain to the spectral domain to obtain a transformed audio signal. In the embodiment of FIG. 1*e*, the apparatus furthermore comprises a spectral-domain preprocessor 118 being configured to conduct encoder-side temporal noise shaping on the transformed audio signal to obtain the normalized audio signal being represented in the spectral domain.

According to an embodiment, the encoding unit 120 may, e.g., be configured to obtain the encoded audio signal by applying encoder-side Stereo Intelligent Gap Filling on the normalized audio signal or on the processed audio signal.

Figure 1F:
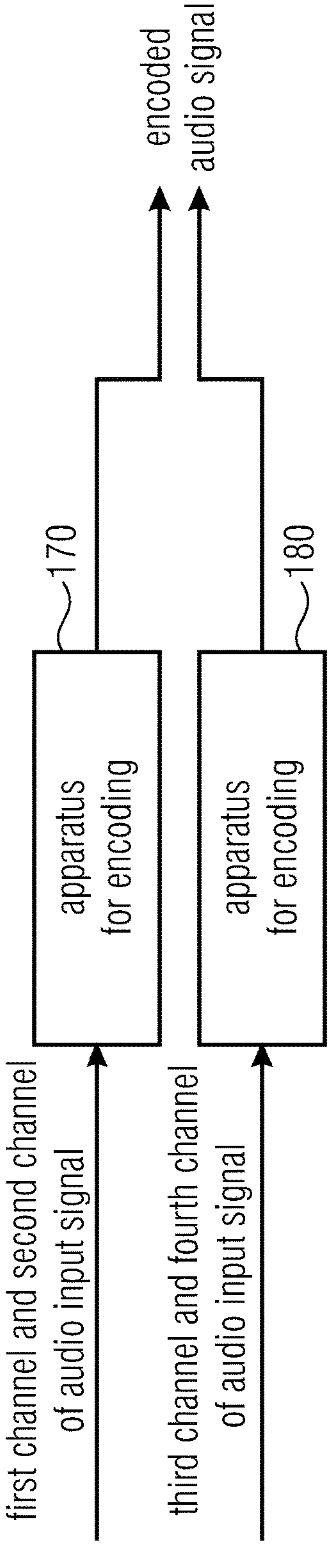
FIG. 1*f* illustrates a system for encoding four channels of an audio input signal comprising four or more channels to obtain four channels of an encoded audio signal according to an embodiment.

In another embodiment, illustrated by FIG. 1*f*, a system for encoding four channels of an audio input signal comprising four or more channels to obtain an encoded audio signal is provided. The system comprises a first apparatus 170 according to one of the above-described embodiments for encoding a first channel and a second channel of the four or more channels of the audio input signal to obtain a first channel and a second channel of the encoded audio signal. Moreover, the system comprises a second apparatus 180 according to one of the above-described embodiments for encoding a third channel and a fourth channel of the four or more channels of the audio input signal to obtain a third channel and a fourth channel of the encoded audio signal.

Figure 2A:
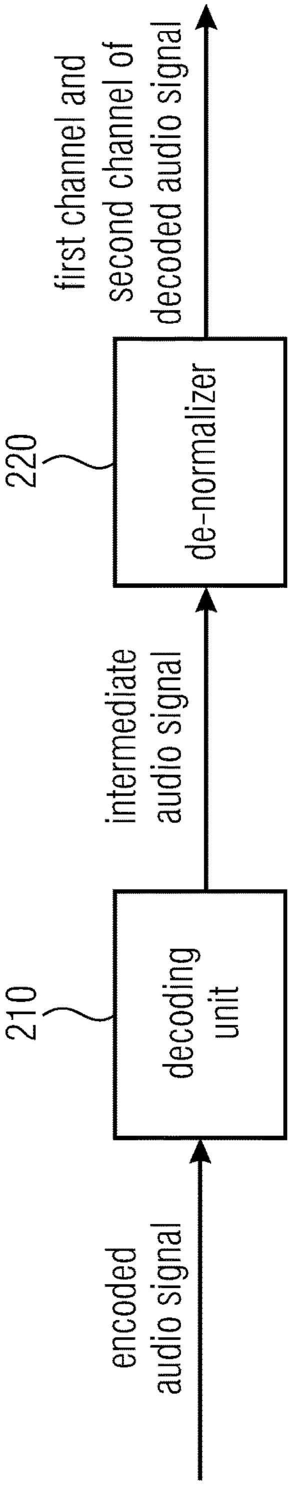
FIG. 2*a* illustrates an apparatus for decoding according to an embodiment.

FIG. 2*a* illustrates an apparatus for decoding an encoded audio signal comprising a first channel and a second channel to obtain a decoded audio signal according to an embodiment.

The apparatus for decoding comprises a decoding unit 210 configured to determine for each spectral band of a plurality of spectral bands, whether said spectral band of the first channel of the encoded audio signal and said spectral band of the second channel of the encoded audio signal was encoded using dual-mono encoding or using mid-side encoding.

The decoding unit 210 is configured to use said spectral band of the first channel of the encoded audio signal as a spectral band of a first channel of an intermediate audio signal and is configured to use said spectral band of the second channel of the encoded audio signal as a spectral band of a second channel of the intermediate audio signal, if the dual-mono encoding was used.

Moreover, the decoding unit 210 is configured to generate a spectral band of the first channel of the intermediate audio signal based on said spectral band of the first channel of the encoded audio signal and based on said spectral band of the second channel of the encoded audio signal, and to generate a spectral band of the second channel of the intermediate audio signal based on said spectral band of the first channel of the encoded audio signal and based on said spectral band of the second channel of the encoded audio signal, if the mid-side encoding was used.

Furthermore, the apparatus for decoding comprises a de-normalizer 220 configured to modify, depending on a de-normalization value, at least one of the first channel and the second channel of the intermediate audio signal to obtain the first channel and the second channel of the decoded audio signal.

In an embodiment, the decoding unit 210 may, e.g., be configured to determine whether the encoded audio signal is encoded in a full-mid-side encoding mode or in a full-dual-mono encoding mode or in a band-wise encoding mode.

Moreover, in such an embodiment, the decoding unit 210 may, e.g., be configured, if it is determined that the encoded audio signal is encoded in the full-mid-side encoding mode, to generate the first channel of the intermediate audio signal from the first channel and from the second channel of the encoded audio signal, and to generate the second channel of the intermediate audio signal from the first channel and from the second channel of the encoded audio signal, According to such an embodiment, the decoding unit 210 may, e.g., be configured, if it is determined that the encoded audio signal is encoded in the full-dual-mono encoding mode, to use the first channel of the encoded audio signal as the first channel of the intermediate audio signal, and to use the second channel of the encoded audio signal as the second channel of the intermediate audio signal.

Furthermore, in such an embodiment, the decoding unit 210 may, e.g., be configured, if it is determined that the encoded audio signal is encoded in the band-wise encoding mode, to determine for each spectral band of a plurality of spectral bands, whether said spectral band of the first channel of the encoded audio signal and said spectral band of the second channel of the encoded audio signal was encoded using the dual-mono encoding or the using mid-side encoding, to use said spectral band of the first channel of the encoded audio signal as a spectral band of the first channel of the intermediate audio signal and to use said spectral band of the second channel of the encoded audio signal as a spectral band of the second channel of the intermediate audio signal, if the dual-mono encoding was used, and to generate a spectral band of the first channel of the intermediate audio signal based on said spectral band of the first channel of the encoded audio signal and based on said spectral band of the second channel of the encoded audio signal, and to generate a spectral band of the second channel of the intermediate audio signal based on said spectral band of the first channel of the encoded audio signal and based on said spectral band of the second channel of the encoded audio signal, if the mid-side encoding was used.

For example, in the full-mid-side encoding mode, the formulae:

$$L = (M + S)/sqrt(2), \text{ and}$$

$$R = (M - S)/sqrt(2)$$

may, e.g., be applied to obtain the first channel L of the intermediate audio signal and to obtain the second channel R of the intermediate audio signal, with M being the first channel of the encoded audio signal and s being the second channel of the encoded audio signal.

According to an embodiment, the decoded audio signal may, e.g., be an audio stereo signal comprising exactly two channels. For example, the first channel of the decoded audio signal may, e.g., be a left channel of the audio stereo signal, and the second channel of the decoded audio signal may, e.g., be a right channel of the audio stereo signal.

According to an embodiment, the de-normalizer 220 may, e.g., be configured to modify, depending on the de-normalization value, the plurality of spectral bands of at least one of the first channel and the second channel of the intermediate audio signal to obtain the first channel and the second channel of the decoded audio signal.

Figure 2B:
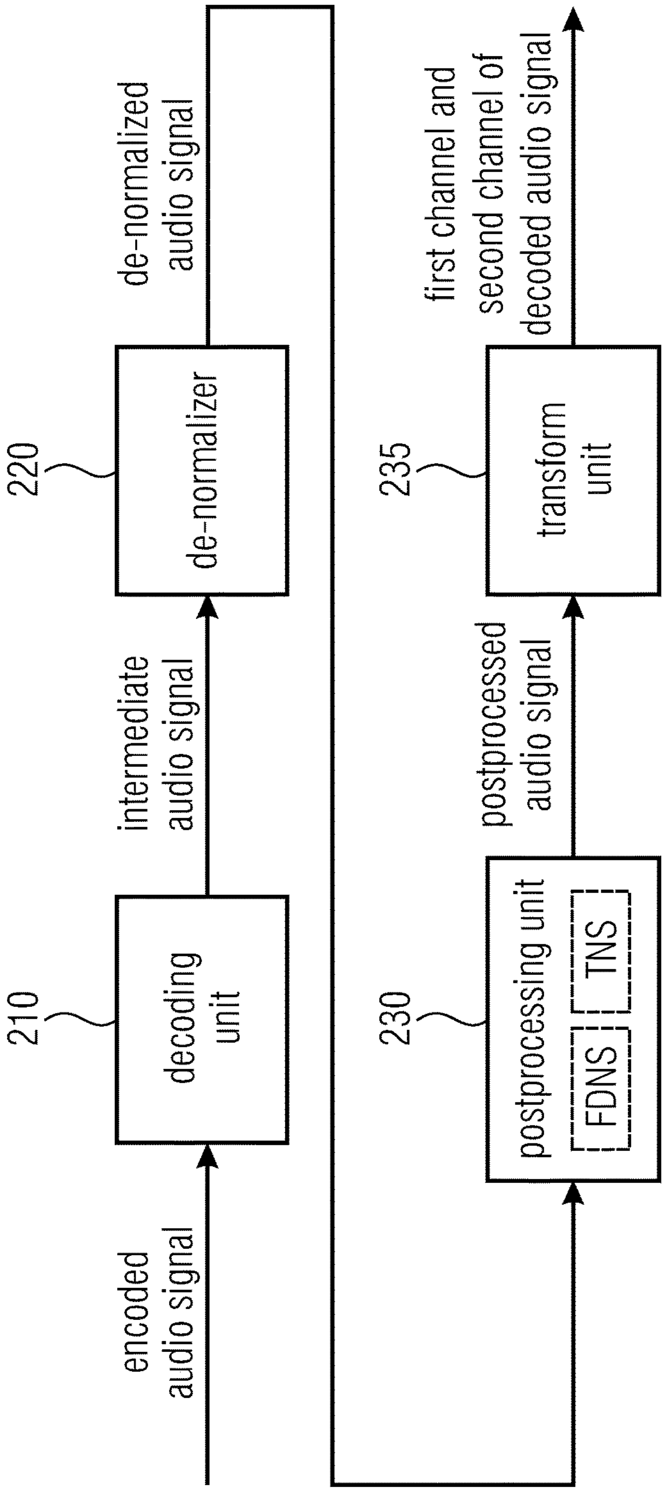
FIG. 2*b* illustrates an apparatus for decoding according to an embodiment further comprising a transform unit and a postprocessing unit.

In another embodiment shown in FIG. 2*b*, the de-normalizer 220 may, e.g., be configured to modify, depending on the de-normalization value, the plurality of spectral bands of at least one of the first channel and the second channel of the intermediate audio signal to obtain a de-normalized audio signal. In such an embodiment, the apparatus may, e.g., furthermore comprise a postprocessing unit 230 and a transform unit 235. The postprocessing unit 230 may, e.g., be configured to conduct at least one of decoder-side temporal noise shaping and decoder-side frequency domain noise shaping on the de-normalized audio signal to obtain a postprocessed audio signal. The transform unit (235) may, e.g., be configured to configured to transform the postprocessed audio signal from a spectral domain to a time domain to obtain the first channel and the second channel of the decoded audio signal.

Figure 2C:
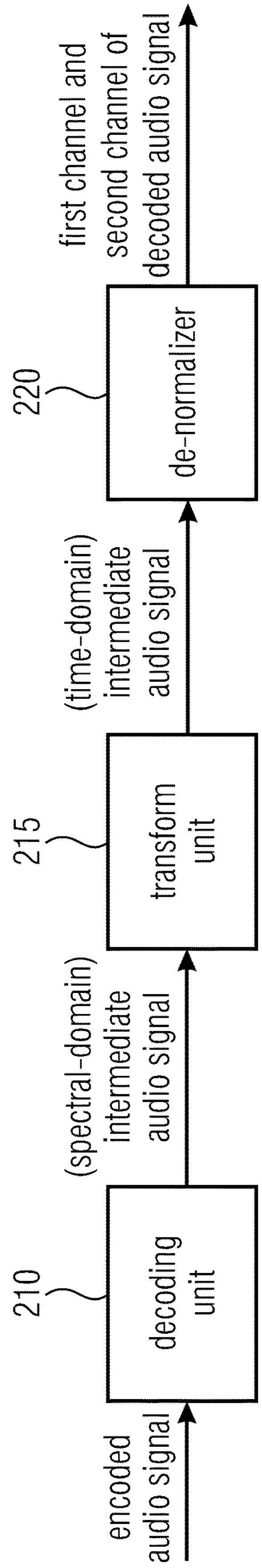
FIG. 2*c* illustrates an apparatus for decoding according to an embodiment, wherein the apparatus for decoding furthermore comprises a transform unit.

According to an embodiment illustrated by FIG. 2*c*, the apparatus further comprises a transform unit 215 configured to transform the intermediate audio signal from a spectral domain to a time domain. The de-normalizer 220 may, e.g., be configured to modify, depending on the de-normalization value, at least one of the first channel and the second channel of the intermediate audio signal being represented in a time domain to obtain the first channel and the second channel of the decoded audio signal.

Figure 2D:
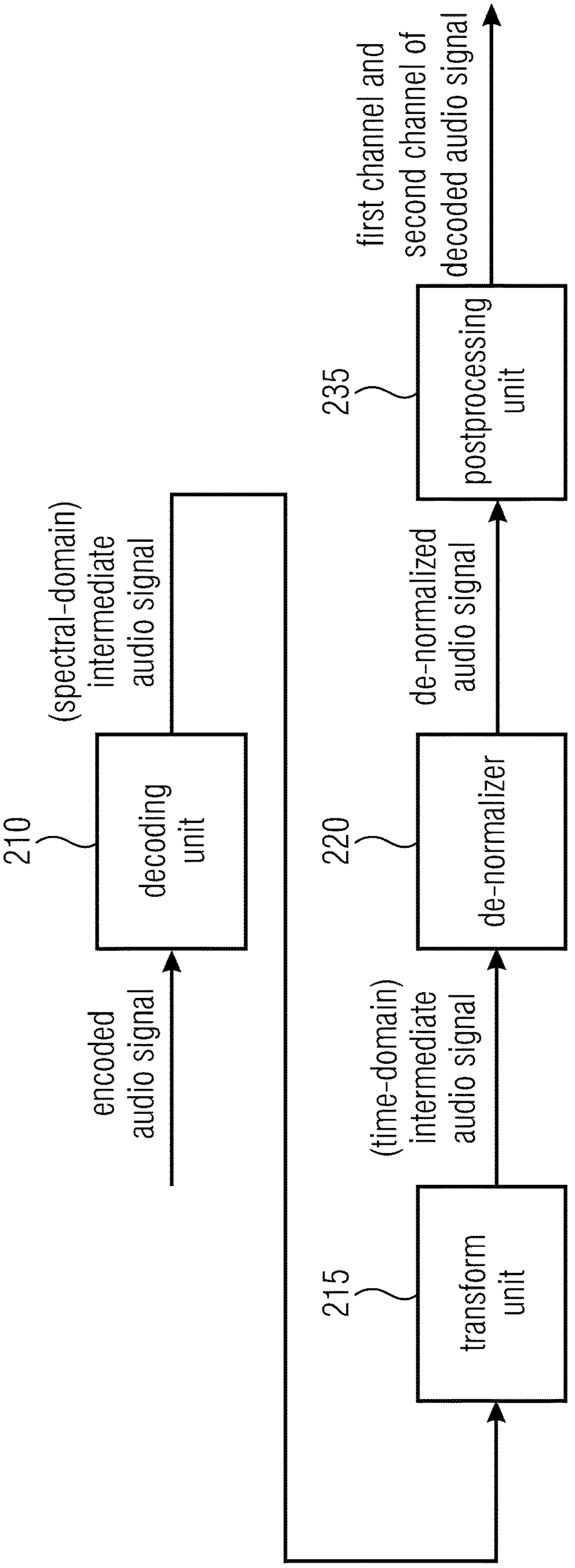
FIG. 2*d* illustrates an apparatus for decoding according to an embodiment, wherein the apparatus furthermore comprises a spectral-domain postprocessor.

In similar embodiment, illustrated by FIG. 2*d*, the transform unit 215 may, e.g., be configured to transform the intermediate audio signal from a spectral domain to a time domain. The de-normalizer 220 may, e.g., be configured to modify, depending on the de-normalization value, at least one of the first channel and the second channel of the intermediate audio signal being represented in a time domain to obtain a de-normalized audio signal. The apparatus further comprises a postprocessing unit 235 which may, e.g., be configured to process the de-normalized audio signal, being a perceptually whitened audio signal, to obtain the first channel and the second channel of the decoded audio signal.

Figure 2E:
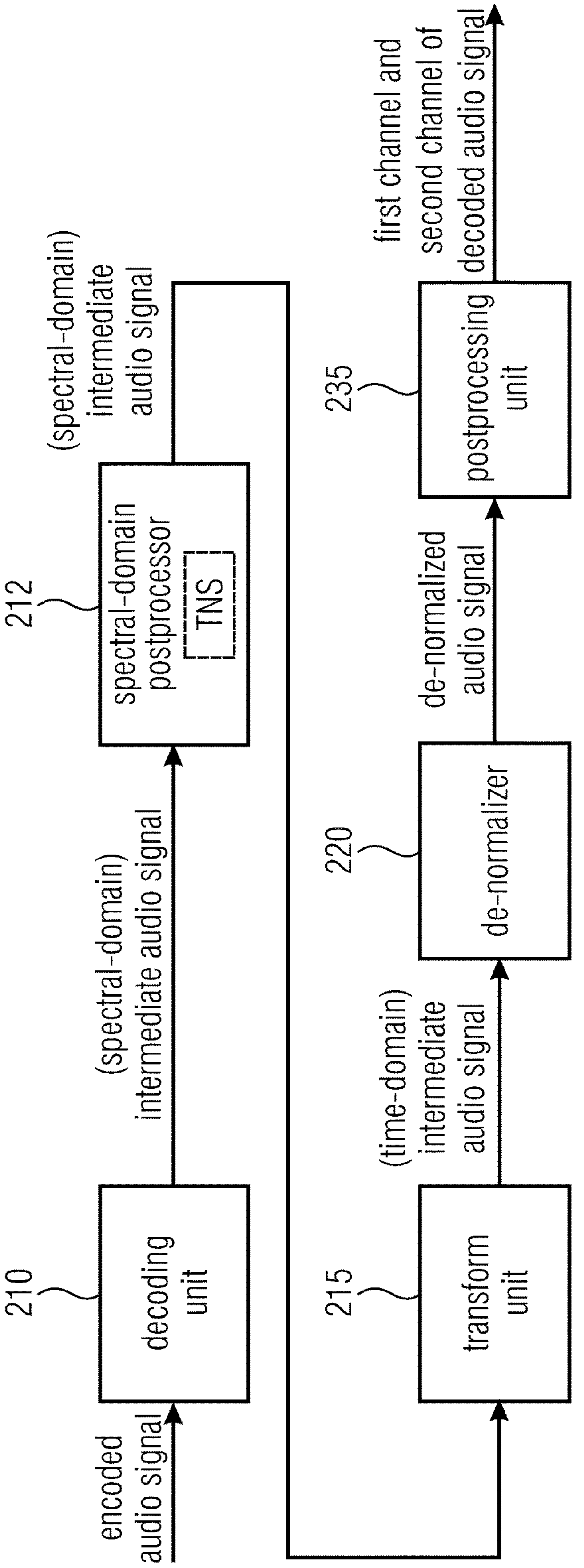
FIG. 2*e* illustrates an apparatus for decoding according to an embodiment, wherein the apparatus for decoding furthermore comprises a postprocessing unit.

According to another embodiment, illustrated by FIG. 2*e*, the apparatus furthermore comprises a spectral-domain postprocessor 212 being configured to conduct decoder-side temporal noise shaping on the intermediate audio signal. In such an embodiment, the transform unit 215 is configured to transform the intermediate audio signal from the spectral domain to the time domain, after decoder-side temporal noise shaping has been conducted on the intermediate audio signal.

In another embodiment, the decoding unit 210 may, e.g., be configured to apply decoder-side Stereo Intelligent Gap Filling on the encoded audio signal.

Figure 2F:
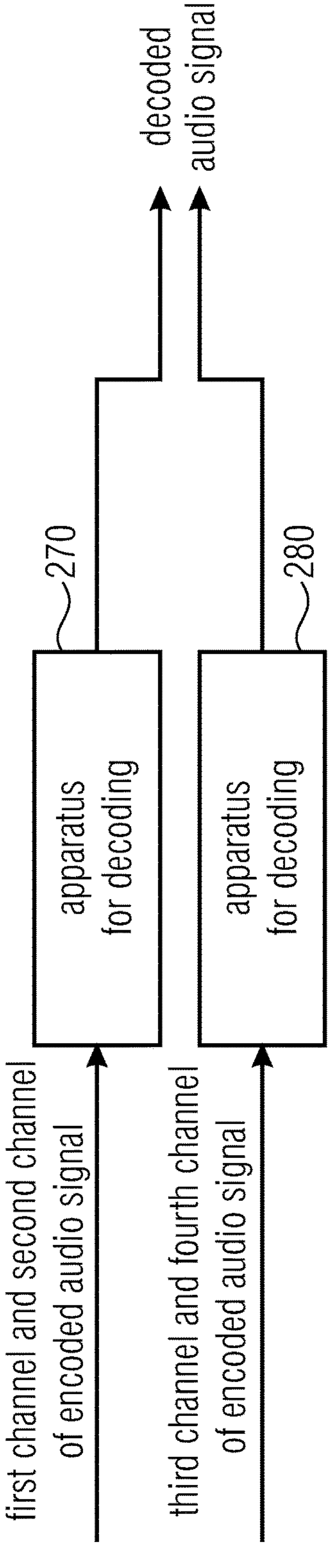

Moreover, as illustrated in FIG. 2*f*, a system for decoding an encoded audio signal comprising four or more channels to obtain four channels of a decoded audio signal comprising four or more channels is provided. The system comprises a first apparatus 270 according to one of the above-described embodiments for decoding a first channel and a second channel of the four or more channels of the encoded audio signal to obtain a first channel and a second channel of the decoded audio signal. Moreover, the system comprises a second apparatus 280 according to one of the above-described embodiments for decoding a third channel and a fourth channel of the four or more channels of the encoded audio signal to obtain a third channel and a fourth channel of the decoded audio signal.

Figure 3:
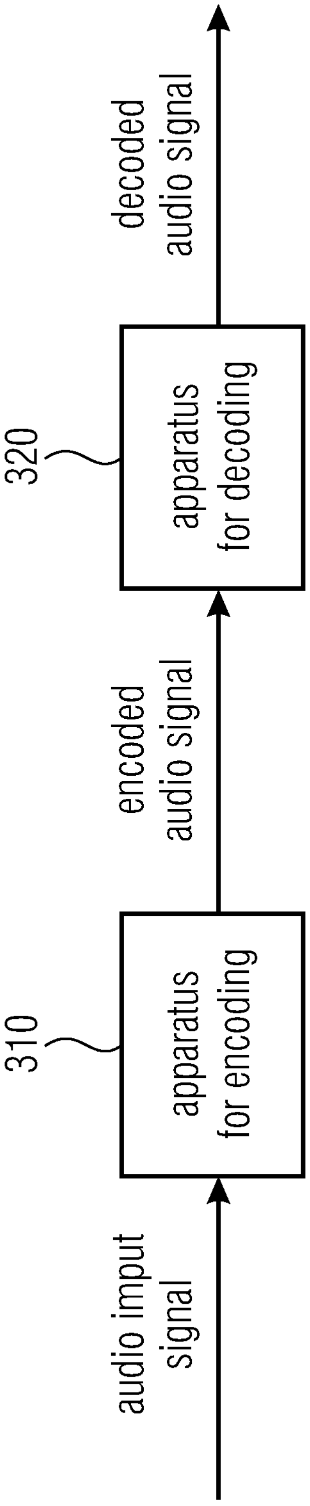
FIG. 3 illustrates a system according to an embodiment.

FIG. 3 illustrates system for generating an encoded audio signal from an audio input signal and for generating a decoded audio signal from the encoded audio signal according to an embodiment.

The system comprises an apparatus 310 for encoding according to one of the above-described embodiments, wherein the apparatus 310 for encoding is configured to generate the encoded audio signal from the audio input signal.

Moreover, the system comprises an apparatus 320 for decoding as described above. The apparatus 320 for decoding is configured to generate the decoded audio signal from the encoded audio signal.

Similarly, a system for generating an encoded audio signal from an audio input signal and for generating a decoded audio signal from the encoded audio signal is provided. The system comprises a system according to the embodiment of FIG. 1*f*, wherein the system according to the embodiment of FIG. 1*f* is configured to generate the encoded audio signal from the audio input signal, and a system according to the embodiment of FIG. 2*f*, wherein the system of the embodiment of FIG. 2*f* is configured to generate the decoded audio signal from the encoded audio signal.

In the following, advantageous embodiments are described.

Figure 4:
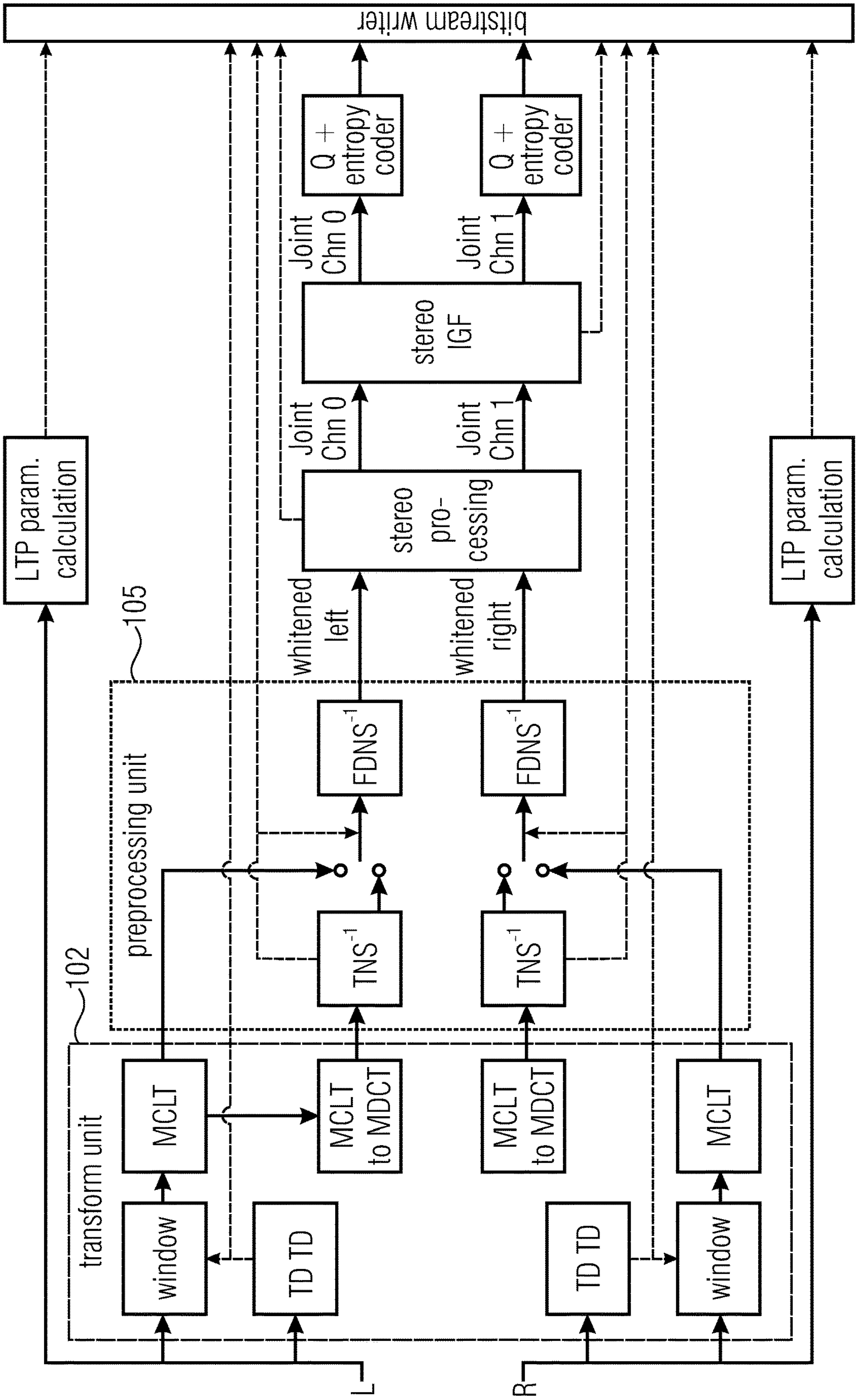
FIG. 4 illustrates an apparatus for encoding according to a further embodiment.

FIG. 4 illustrates an apparatus for encoding according to another embodiment. Inter alia, a preprocessing unit 105 and a transform unit 102 according to a particular embodiment are illustrated. The transform unit 102 is inter alia configured to conduct a transformation of the audio input signal from a time domain to a spectral domain, and the transform unit is configured to encoder-side conduct temporal noise shaping and encoder-side frequency domain noise shaping on the audio input signal.

Figure 5:
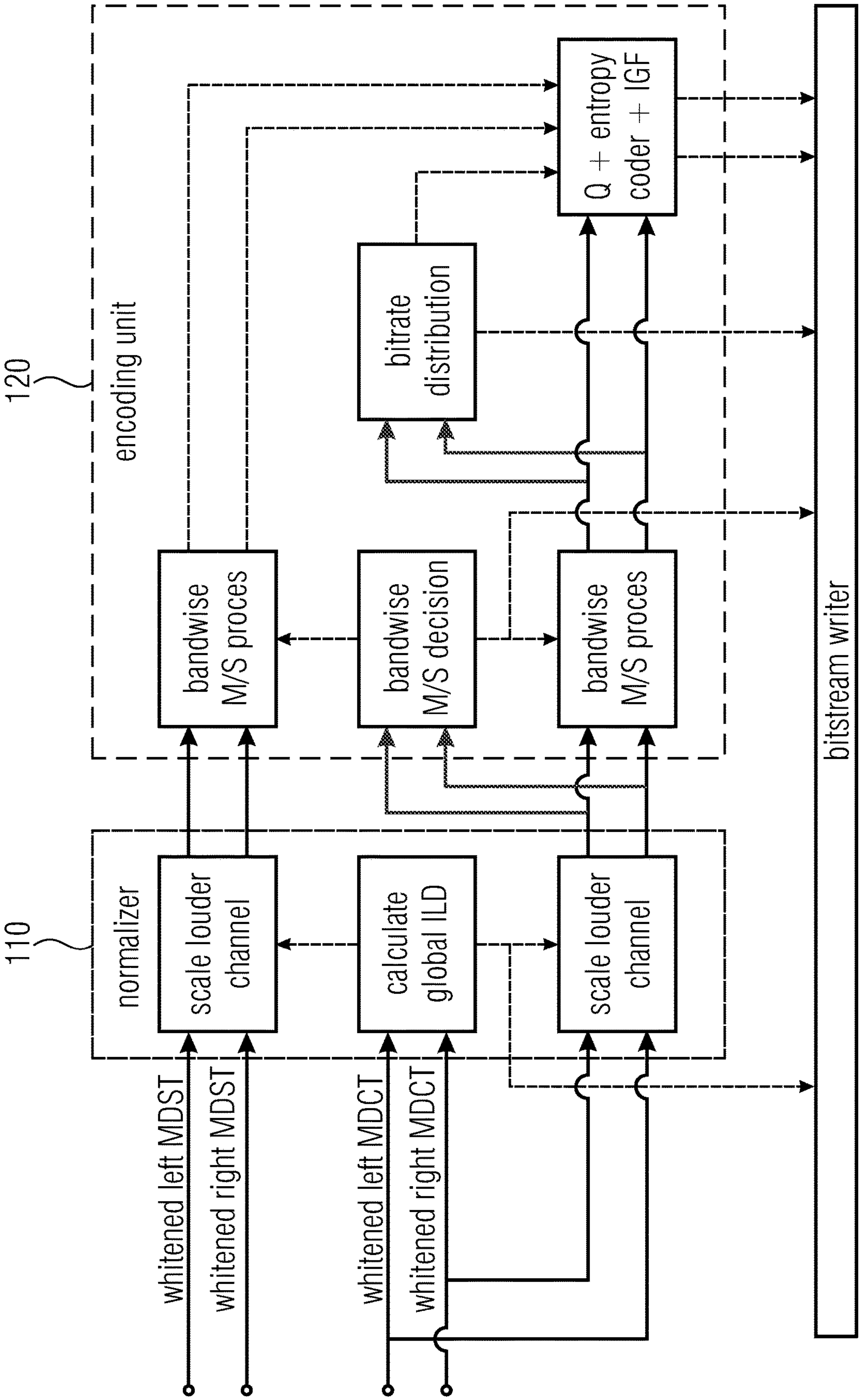
FIG. 5 illustrates stereo processing modules in an apparatus for encoding according to an embodiment.

Moreover, FIG. 5 illustrates stereo processing modules in an apparatus for encoding according to an embodiment. FIG. 5 illustrates a normalizer 110 and an encoding unit 120.

Figure 6:
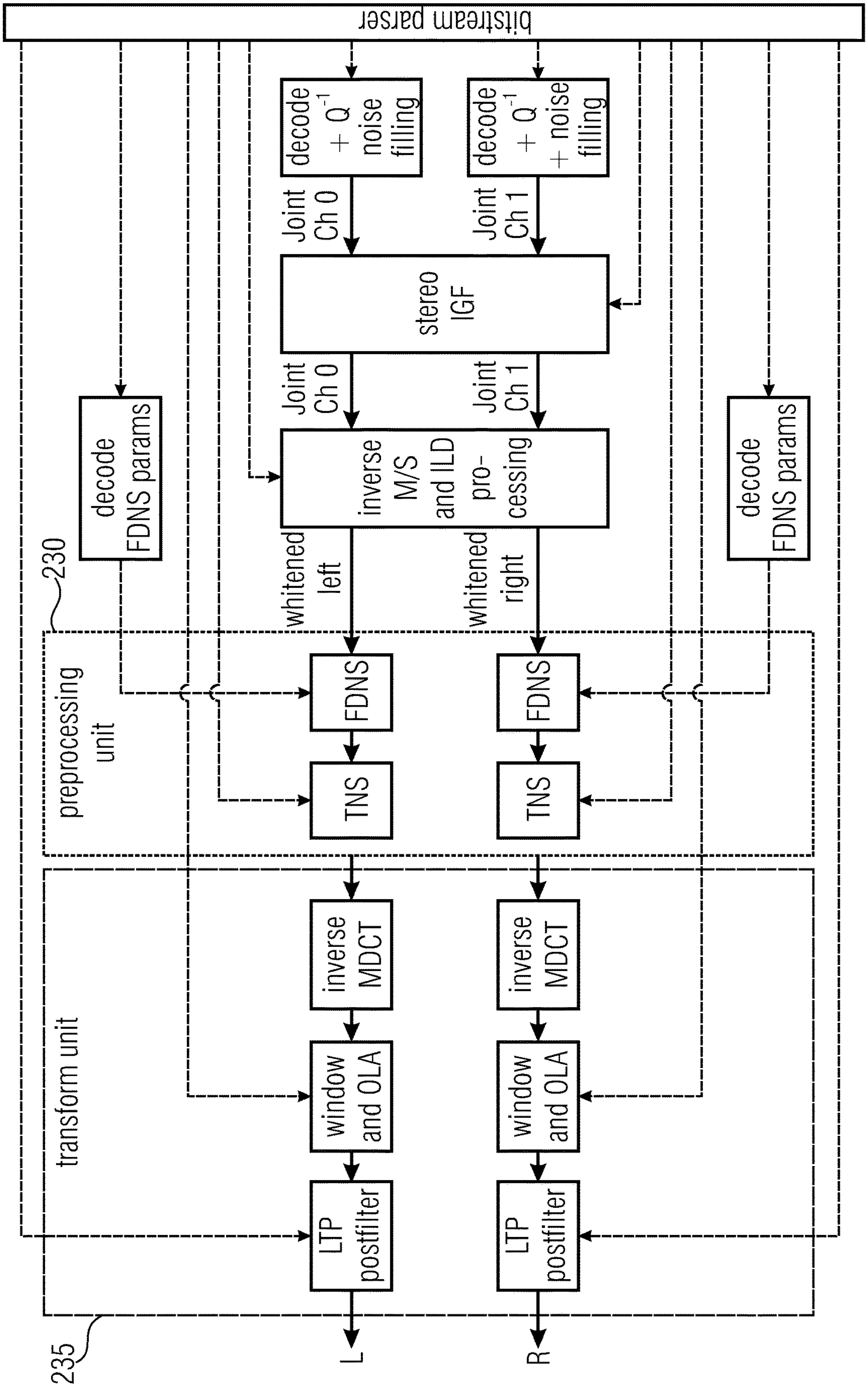
FIG. 6 illustrates an apparatus for decoding according to another embodiment.

Furthermore, FIG. 6 illustrates an apparatus for decoding according to another embodiment. Inter alia, FIG. 6 illustrates a postprocessing unit 230 according to a particular embodiment. The postprocessing unit 230 is inter alia configured to obtain a processed audio signal from the de-normalizer 220, and the postprocessing unit 230 is configured to conduct at least one of decoder-side temporal noise shaping and decoder-side frequency domain noise shaping on the processed audio signal.

Time Domain Transient Detector (TD TD), Windowing, MDCT, MDST and OLA may, e.g., be done as described in [6a] or [6b]. MDCT and MDST form Modulated Complex Lapped Transform (MCLT); performing separately MDCT and MDST is equivalent to performing MCLT; "MCLT to MDCT" represents taking just the MDCT part of the MCLT and discarding MDST (see [12]).

Choosing different window lengths in the left and the right channel may, e.g., force dual mono coding in that frame.

Temporal Noise Shaping (TNS) may, e.g., be done similar as described in [6a] or [6b].

Frequency domain noise shaping (FDNS) and the calculation of FDNS parameters may, e.g., be similar to the procedure described in [8]. One difference may, e.g., be that the FDNS parameters for frames where TNS is inactive are calculated from the MCLT spectrum. In frames where the TNS is active, the MDST may, e.g., be estimated from the MDCT.

The FDNS may also be replaced with the perceptual spectrum whitening in the time domain (as, for example, described in [13]).

Stereo processing consists of global ILD processing, band-wise M/S processing, bitrate distribution among channels.

Single global ILD is calculated as $$NRG_L = \sqrt{\sum MDCT_{L,k}^2}$$

$$NRG_R = \sqrt{\sum MDCT_{R,k}^2}$$

$$ILD = \frac{NRG_L}{NRG_L + NRG_R}$$

where $MDCT_{L,k}$ is the k-th coefficient of the MDCT spectrum in the left channel and $MDCT_{R,k}$ is the k-th coefficient of the MDCT spectrum in the right channel. The global ILD is uniformly quantized:

$$\hat{ILD} = \max(1, \min(ILD_{range} - 1, \lfloor ILD_{range} \cdot ILD + 0.5 \rfloor))$$

$$ILD_{range} = 1 \ll ILD_{bits}$$

where $ILD_{bits}$ is the number of bits used for coding the global ILD. $\hat{ILD}$ is stored in the bitstream.

« is a bit shift operation and shifts the bits by $ILD_{bits}$ to the left by inserting 0 bits.

In other words: $ILD_{range}=2^{ILD_{bits}}$.

The energy ratio of the channels is then:

$$\text{ratio}_{ILD} = \frac{ILD_{range}}{\hat{ILD}} - 1 \approx \frac{NRG_R}{NRG_L}$$

If $\text{ratio}_{ILD}>1$ then the right channel is scaled with $$\frac{1}{\text{ratio}_{ILD}},$$

otherwise the left channel is scaled with $\text{ratio}_{ILD}$. This effectively means that the louder channel is scaled.

If the perceptual spectrum whitening in the time domain is used (as, for example, described in [13]), the single global ILD can also be calculated and applied in the time domain, before the time to frequency domain transformation (i.e. before the MDCT). Or, alternatively, the perceptual spectrum whitening may be followed by the time to frequency domain transformation followed by the single global ILD in the frequency domain. Alternatively the single global ILD may be calculated in the time domain before the time to frequency domain transformation and applied in the frequency domain after the time to frequency domain transformation.

The mid $MDCT_{M,k}$ and the side $MDCT_{S,k}$ channels are formed using the left channel $MDCT_{L,k}$ and the right channel $MDCT_{R,k}$ as $MDCT_{M,k}=1/\sqrt{2}(MDCT_{L,k}+MDCT_{R,k})$ and $MDCT_{S,k}=1/\sqrt{2}(MDCT_{L,k}+MDCT_{R,k})$. The spectrum is divided into bands and for each band it is decided if the left, right, mid or side channel is used.

A global gain $G_{est}$ is estimated on the signal comprising the concatenated Left and Right channels. Thus is different from [6b] and [6a]. The first estimate of the gain as described in chapter 5.3.3.2.8.1.1 "Global gain estimator" of [6b] or of [6a] may, for example, be used, for example, assuming an SNR gain of 6 dB per sample per bit from the scalar quantization.

The estimated gain may be multiplied with a constant to get an underestimation or an overestimation in the final $G_{est}$. Signals in the left, right, mid and side channels are then quantized using $G_{est}$, that is the quantization step size is $1/G_{est}$.

The quantized signals are then coded using an arithmetic coder, a Huffman coder or any other entropy coder, in order to get the number of bits that may be used. For example, the context based arithmetic coder described in chapter 5.3.3.2.8.1.3-chapter 5.3.3.2.8.1.7 of [6b] or of [6a] may be used. Since the rate loop (e.g. 5.3.3.2.8.1.2 in [6b] or in [6a]) will be run after the stereo coding, an estimation of the bits that may be used is enough.

As an example, for each quantized channel number of bits that may be used for context based arithmetic coding is estimated as described in chapter 5.3.3.2.8.1.3-chapter 5.3.3.2.8.1.7 of [6b] or of [6a].

According to an embodiment, the bit estimation for each quantized channel (left, right, mid or side) is determined based on the following example code:

```
int context_based_arihmetic_coder_estimate (
  int spectrum[ ],
  int start_line,
  int end_line,
  int lastnz, // lastnz = last non-zero spectrum line
  int & ctx, // ctx = context
  int & probability, // 14 bit fixed point probability
  const unsigned int cum_freq[N_CONTEXTS][ ]
   // cum_freq = cumulative frequency tables, 14 bit fixed point
)
{
  int nBits = 0;
  for (int k = start_line; k < min(lastnz, end_line); k+=2)
  {
    int a1 = abs(spectrum[k]);
    int b1 = abs(spectrum[k+1]);
    /* Signs Bits */
    nBits += min(a1, 1);
    nBits += min(b1, 1);
    while (max(a1, b1) >= 4)
    {
      probability *= cum_freq[ctx][VAL_ESC];
      int nlz = Number_of_leading_zeros(probability);
      nBits += 2 + nlz;
      probability >>= 14 - nlz;
      a1 >>= 1;
      b1 >>= 1;
      ctx = update_context(ctx, VAL_ESC);
    }
    int symbol = a1 + 4*b1;
    probability *= (cum_freq[ctx][symbol] -
        cum_freq[ctx][symbol+1]);
    int nlz = Number_of_leading_zeros(probability);
    nBits += nlz;
    hContextMem->proba >>= 14 - nlz;
    ctx = update_context(ctx, a1+b1);
  }
  return nBits;
}
```

where spectrum is set to point to the quantized spectrum to be coded, start_line is set to 0, end_line is set to the length of the spectrum, lastnz is set to the index of the last non-zero element of spectrum, ctx is set to 0 and probability is set to 1 in 14 bit fixed point notation (16384=1«14).

As outlined, the above example code may be employed, for example, to obtain a bit estimation for at least one of the left channel, the right channel, the mid channel and the side channel.

Some embodiments employ an arithmetic coder as described in [6b] and [6a]. Further details may, e.g., be found in chapter 5.3.3.2.8 "Arithmetic coder" of [6b].

An estimated number of bits for "full dual mono" ($b_{LR}$) is then equal to the sum of the bits that may be used for the right and the left channel.

An estimated number of bits for the "full M/S" ($b_{MS}$) is then equal to the sum of the bits that may be used for the Mid and the Side channel.

In an alternative embodiment, which is an alternative to the above example code, the formula:

$$b_{LR} = \sum_{i=0}^{nBands-1} b_{bwLR}^{i}$$

may, e.g., be employed to calculate an estimated number of bits for "full dual mono") ($b_{LR}$).

Moreover, in an alternative embodiment, which is an alternative to the above example code, the formula:

$$b_{MS} = \sum_{i=0}^{nBands-1} b_{bwMS}^{i}$$

may, e.g., be employed to calculate an estimated number of bits for the "full M/S" ($b_{MS}$).

For each band r with borders [$lb_i$, $ub_i$], it is checked how many bits would be used for coding the quantized signal in the band in the L/R $$(b_{bwLR}^{i})$$

and in the M/S $$(b_{bwMS}^{i})$$

mode. In other words, a band-wise bit estimation is conducted for the L/R mode for each band i:

$$b_{bwLR}^{i},$$

which results in the UR mode band-wise bit estimation for band i, and a band-wise bit estimation is conducted for the M/S mode for each band i, which results in the M/S mode band-wise bit estimation for band i:

$$b_{bwMS}^{i}.$$

The mode with fewer bits is chosen for the band. The number of bits that may be used for arithmetic coding is estimated as described in chapter 5.3.3.2.8.1.3-chapter 5.3.3.2.8.1.7 of [6b] or of [6a]. The total number of bits that may be used for coding the spectrum in the "band-wise M/S" mode ($b_{BW}$) is equal to the sum of $$\min(b_{bwLR}^{i}, b_{bwMS}^{i}):$$

$$b_{BW} = nBands + \sum_{i=0}^{nBands-1} \min(b_{bwLR}^{i}, b_{bwMS}^{i}),$$

The "band-wise M/S" mode needs additional nBands bits for signaling in each band whether L/R or M/S coding is used. The choice between the "band-wise M/S", the "full dual mono" and the "full M/S" may, e.g., be coded as the stereo mode in the bitstream and then the "full dual mono" and the "full M/S" don't need additional bits, compared to the "band-wise M/S", for signaling.

For the context based arithmetic coder, $$b_{bwLR}^{i}$$

is used in the calculation of bLR is not equal to $$b_{bwLR}^{i}$$

used in the calculation of bBW, nor is $$b_{bwMS}^{i}$$

used in the calculation of bMS equal to $$b_{bwMS}^{i}$$

used in the calculation of bBW, as the $$b_{bwLR}^{i}$$

and the $$b_{bwMS}^{i}$$

depend on the choice of the context for the previous $$b_{bwLR}^{j}$$

and $$b_{bwMS}^{j},$$

where j<i. bLR may be calculated as the sum of the bits for the Left and for the Right channel and bMS may be calculated as the sum of the bits for the Mid and for the Side channel, where the bits for each channel can be calculated using the example code context_based_arihmetic_coder_estimate_bandwise where start_line is set to 0 and end_line is set to lastnz.

In an alternative embodiment, which is an alternative to the above example code, the formula:

$$b_{LR} = nBands + \sum_{i=0}^{nBands-1} b^i_{bwLR}$$

may, e.g., be employed to calculate an estimated number of bits for "full dual mono" ($b_{LR}$) and signaling in each band L/R coding may be used.

Moreover, in an alternative embodiment, which is an alternative to the above example code, the formula:

$$b_{MS} = nBands + \sum_{i=0}^{nBands-1} b^i_{bwMS}$$

may, e.g., be employed to calculate an estimated number of bits for the "full M/S" ($b_{MS}$) and signaling in each band M/S coding may be used.

In some embodiments, at first, a gain G may, e.g., be estimated and a quantization step size may, e.g., estimated, for which it is expected that there are enough bits to code the channels in L/R.

In the following, embodiments are provided which describe different ways how to determine a band-wise bit estimation, e.g., it is described how to determine $$b^i_{bwLR}$$

and $$b^i_{bwMS}$$

according to particular embodiments.

As already outlined, according to a particular embodiment, for each quantized channel, the number of bits that may be used for arithmetic coding is estimated, for example, as described in chapter 5.3.3.2.8.1.7 "Bit consumption estimation" of [6b] or of the similar chapter of [6a].

According to an embodiment, the band-wise bit estimation is determined using context_based_arihmetic_coder_estimate for calculating each of $$b^i_{bwLR}$$

and $$b^i_{bwMS}$$

for every i, by setting start_line to $lb_i$, end_line to $ub_i$, lastnz to the index of the last non-zero element of spectrum.

Four contexts ($ctx_L$, $ctx_R$, $ctx_M$, $ctx_M$) and four probabilities ($p_L$, $p_R$, $p_M$, $p_M$) are initialized and then repeatedly updated.

At the beginning of the estimation (for i=0) each context ($ctx_L$, $ctx_R$, $ctx_M$, $ctx_M$) is set to 0 and each probability ($p_L$, $p_R$, $p_M$, $p_M$) is set to 1 in 14 bit fixed point notation (16384=1«14).

$$b^i_{bwLR}$$

is calculated as sum of $$b^i_{bwL}$$

and $$b^i_{bwR},$$

where $$b^i_{bwL}$$

is determined using context_based_arihmetic_coder_estimate by setting spectrum to point to the quantized left spectrum to be coded, ctx is set to $ctx_L$ and probability is set to $p_L$ and $$b^i_{bwR}$$

is determined using context_based_arihmetic_coder_estimate by setting spectrum to point to the quantized right spectrum to be coded, ctx is set to $ctx_R$ and probability is set to $p_R$.

$$b^i_{bwMS}$$

is calculated as sum of $$b^i_{bwM}$$

and $$b^i_{bwS},$$

where $$b^i_{bwM}$$

is determined using context_based_arihmetic_coder_estimate by setting spectrum to point to the quantized mid spectrum to be coded, ctx is set to $ctx_M$ and probability is set to $p_M$ and $$b^i_{bwS}$$

is determined using context_based_arihmetic_coder_estimate by setting spectrum to point to the quantized side spectrum to be coded. ctx is set to $ctx_S$ and probability is set to $p_S$.

If $$b^i_{bwLR} < b^i_{bwMS}$$

then $ctx_L$ is set to $ctx_M$, $ctx_R$ is set to $ctx_S$, $p_L$ is set to $p_M$, $p_R$ is set to $p_S$.

If $$b^i_{bwLR} >= b^i_{bwMS}$$

then $ctx_M$ is set to $ctx_L$, $ctx_S$ is set to $ctx_R$, $p_M$ is set to $p_L$, $p_S$ is set to $p_R$.

In an alternative embodiment, the band-wise bit estimation is obtained as follows:

The spectrum is divided into bands and for each band it is decided if M/S processing should be done. For all bands where M/S is used, $MDCT_{L,k}$ and $MDCT_{R,k}$ are replaced with $MDCT_{M,k}=0.5(MDCT_{L,k}+MDCT_{R,k})$ and $MDCT_{S,k}=0.5(MDCT_{L,k}-MDCT_{R,k})$.

Band-wise M/S vs L/R decision may, e.g., be based on the estimated bit saving with the M/S processing:

$$bitsSaved_i = nlines_i \cdot \log_2 \sqrt{\frac{NRG_{R,i} NRG_{L,i}}{NRG_{M,i} NRG_{S,i}}}$$

where $NRG_{R,i}$ is the energy in the t-th band of the right channel, $NRG_{L,i}$ is the energy in the i-th band of the left channel, $NRG_{M,i}$ is the energy in the i-th band of the mid channel, $NRG_{S,i}$ is the energy in the i-th band of the side channel and $nlines_i$ is the number of spectral coefficients in the i-th band. Mid channel is the sum of the left and the right channel, side channel is the differences of the left and the right channel.

$bitsSaved_i$ is limited with the estimated number of bits to be used for the i-th band:

$$\max Bits_{LR} = \left(\frac{NRG_{R,i}}{NRG_R} + \frac{NRG_{L,i}}{NRG_L}\right) \cdot bitsAvailable$$

$$\max Bits_{MS} = \left(\frac{NRG_{M,i}}{NRG_M} + \frac{NRG_{S,i}}{NRG_S}\right) \cdot bitsAvailable$$

$$bitsSaved_i = \max(\max Bits_{LR}, \min(-\max Bits_{MS}, bitsSaved_i))$$

Figure 7:
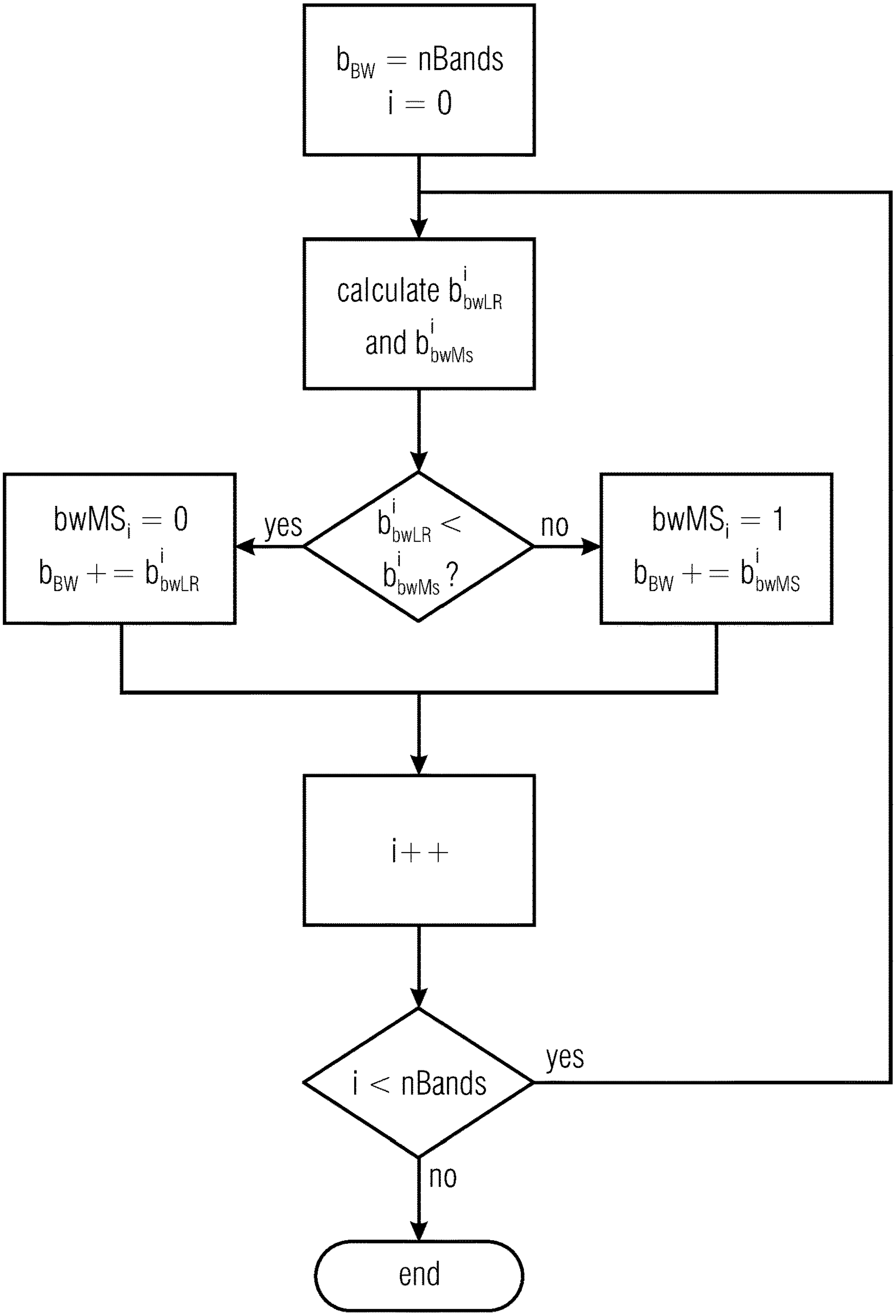
FIG. 7 illustrates a calculation of a bitrate for band-wise M/S decision according to an embodiment.

FIG. 7 illustrates calculating a bitrate for band-wise M/S decision according to an embodiment.

In particular, in FIG. 7, the process for calculating $b_{BW}$ is depicted. To reduce the complexity, arithmetic coder context for coding the spectrum up to band i−1 is saved and reused in the band i.

It should be noted that for the context based arithmetic coder, $$b^i_{bwLR}$$

and $$b^i_{bwMS}$$

depend on the arithmetic coder context, which depends on the M/S vs L/R choice in all bands j<i, as, e.g., described above.

Figure 8:
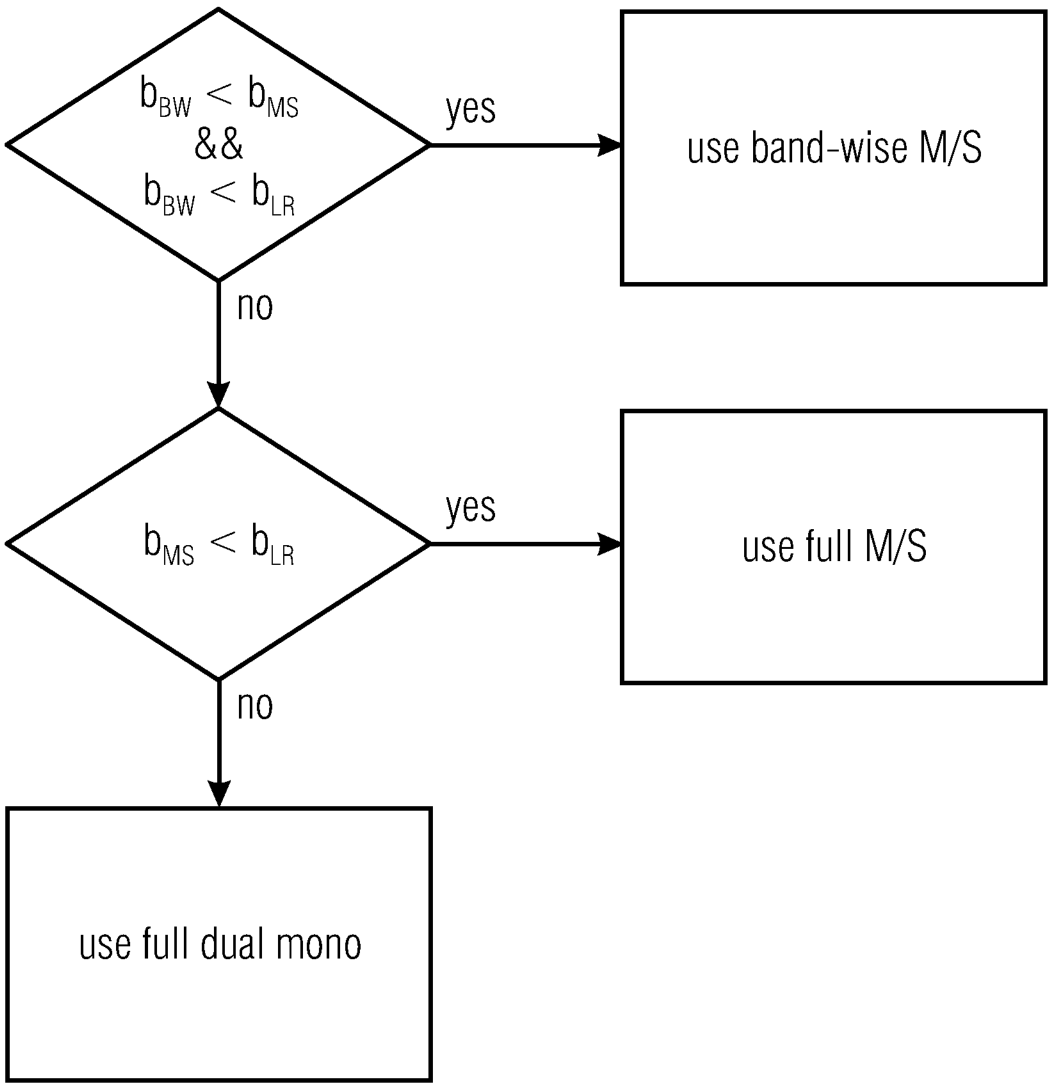
FIG. 8 illustrates a stereo mode decision according to an embodiment.

FIG. 8 illustrates a stereo mode decision according to an embodiment.

If "full dual mono" is chosen then the complete spectrum consists of $MDCT_{L,k}$ and $MDCT_{R,k}$. If "full M/S" is chosen then the complete spectrum consists of $MDCT_{M,k}$ and $MDCT_{S,k}$. If "band-wise M/S" is chosen then some bands of the spectrum consist of $MDCT_{L,k}$ and $MDCT_{R,k}$ and other bands consist of $MDCT_{M,k}$ and $MDCT_{S,k}$.

The stereo mode is coded in the bitstream. In "band-wise M/S" mode also band-wise M/S decision is coded in the bitstream.

The coefficients of the spectrum in the two channels after the stereo processing are denoted as $MDCT_{LM,k}$ and $MDCT_{RS,k}$. $MDCT_{LM,k}$ is equal to $MDCT_{M,k}$ in M/S bands or to $MDCT_{L,k}$ in L/R bands and $MDCT_{RSM,k}$ is equal to $MDCT_{S,k}$ in M/S bands or to $MDCT_{R,k}$ in L/R bands, depending on the stereo mode and band-wise M/S decision. The spectrum consisting of $MDCT_{LM,k}$ may, e.g., be referred to as jointly coded channel 0 (Joint Chn 0) or may, e.g., be referred to as first channel, and the spectrum consisting of $MDCT_{RS,k}$ may, e.g., be referred to as jointly coded channel 1 (Joint Chn 1) or may, e.g., be referred to as second channel.

The bitrate split ratio is calculated using the energies of the stereo processed channels:

$$NRG_{LM} = \sqrt{\sum MDCT^2_{LM,k}}$$

$$NRG_{RS} = \sqrt{\sum MDCT^2_{RS,k}}$$

$$r_{split} = \frac{NRG_{LM}}{NRG_{LM} + NRG_{RS}}$$

The bitrate split ratio is uniformly quantized:

$$\widehat{r_{split}} = \max(1, \min(rsplit_{range} - 1, \lfloor rsplit_{range} \cdot r_{split} + 0.5 \rfloor))$$

$$rsplit_{range} = 1 \ll rsplit_{bits}$$

where $rsplit_{bits}$ is the number of bits used for coding the bitrate split ratio. If $$r_{split} < \frac{8}{9} \text{ and } \widehat{r_{split}} > \frac{9 rsplit_{range}}{16}$$

then $\widehat{r_{split}}$ is decreased for $$\frac{rsplit_{range}}{8}.$$

If $$r_{split} > \frac{1}{9} \text{ and } \widehat{r_{split}} < \frac{7 rsplit_{range}}{16}$$

then $\widehat{r_{split}}$ is increased for $$\frac{rsplit_{range}}{8}$$

$\widehat{r_{split}}$ is stored in the bitstream.

The bitrate distribution among channels is:

$$\text{bits}_{LM} = \left\lfloor \frac{\widehat{r_{split}}}{rsplit_{range}} (totalBitsAvailable - stereoBits) \right\rfloor$$

$$\text{bits}_{RS} = (totalBitsAvailable - stereoBits) - \text{bits}_{LM}$$

Additionally it is made sure that there are enough bits for the entropy coder in each channel by checking that $\text{bits}_{LM} - \text{sideBits}_{LM} > \text{minBits}$ and $\text{bits}_{RS} - \text{sideBits}_{RS} > \text{minBits}$, where minBits is the minimum number of bits that may be used by the entropy coder. If there is not enough bits for the entropy coder then $\widehat{r_{split}}$ is increased/decreased by $\text{bits}_{LM} - \text{sideBits}_{LM} > \text{minBits}$ and $\text{bits}_{RS} - \text{sideBits}_{RS} > \text{minBits}$ are fulfilled.

Quantization, noise filling and the entropy encoding, including the rate-loop, are as described in 5.3.3.2 "General encoding procedure" of 5.3.3 "MDCT based TCX" in [6b] or in [6a]. The rate-loop can be optimized using the estimated $G_{est}$. The power spectrum P (magnitude of the MCLT) is used for the tonality/noise measures in the quantization and Intelligent Gap Filling (IGF) as described in [6a] or [6b]. Since whitened and band-wise M/S processed MDCT spectrum is used for the power spectrum, the same FDNS and M/S processing is to be done on the MDST spectrum. The same scaling based on the global ILD of the louder channel is to be done for the MDST as it was done for the MDCT. For the frames where TNS is active, MDST spectrum used for the power spectrum calculation is estimated from the whitened and M/S processed MDCT spectrum: $P_k = \text{MDCT}_k^2 + (\text{MDCT}_{k+1} - \text{MDCT}_{k-1})^2$.

The decoding process starts with decoding and inverse quantization of the spectrum of the jointly coded channels, followed by the noise filling as described in 6.2.2 "MDCT based TCX" in [6b] or [6a]. The number of bits allocated to each channel is determined based on the window length, the stereo mode and the bitrate split ratio that are coded in the bitstream. The number of bits allocated to each channel may be known before fully decoding the bitstream.

In the intelligent gap filling (IGF) block, lines quantized to zero in a certain range of the spectrum, called the target tile are filled with processed content from a different range of the spectrum, called the source tile. Due to the band-wise stereo processing, the stereo representation (i.e. either L/R or M/S) might differ for the source and the target tile. To ensure good quality, if the representation of the source tile is different from the representation of the target tile, the source tile is processed to transform it to the representation of the target file prior to the gap filling in the decoder. This procedure is already described in [9]. The IGF itself is, contrary to [6a] and [6b], applied in the whitened spectral domain instead of the original spectral domain. In contrast to the known stereo codecs (e.g. [9]), the IGF is applied in the whitened, ILD compensated spectral domain.

Based on the stereo mode and band-wise M/S decision, left and right channel are constructed from the jointly coded channels: $\text{MDCT}_{L,k} = 1/\sqrt{2}(\text{MDCT}_{LM,k} + \text{MDCT}_{RS,k})$ and $\text{MDCT}_{R,k} = 1/\sqrt{2}(\text{MDCT}_{LM,k} + \text{MDCT}_{RS,k})$.

If $\text{ratio}_{ILD} > 1$ then the right channel is scaled with $\text{ratio}_{ILD}$, otherwise the left channel is scaled with $$\frac{1}{\text{ratio}_{ILD}}.$$

For each case where division by 0 could happen, a small epsilon is added to the denominator.

For intermediate bitrates, e.g. 48 kbps, MDCT-based coding may, e.g., lead to too coarse quantization of the spectrum to match the bit-consumption target. That raises the need for parametric coding, which combined with discrete coding in the same spectral region, adapted on a frame-to-frame basis, increases fidelity.

In the following, aspects of some of those embodiments, which employ stereo filling, are described. It should be noted that for the above embodiments, it is not necessary that stereo filling is employed. So, only some of the above-described embodiments employ stereo filling. Other embodiments of the above-described embodiments do not employ stereo filling at all.

Stereo frequency filling in MPEG-H frequency-domain stereo is, for example, described in [11]. In [11] the target energy for each band is reached by exploiting the band energy sent from the encoder in the form of scale factors (for example in AAC). If frequency-domain noise (FDNS) shaping is applied and the spectral envelope is coded by using the LSFs (line spectral frequencies) (see [6a], [6b], [8]) it is not possible to change the scaling only for some frequency bands (spectral bands) as needed from the stereo filling algorithm described in [11].

At first some background information is provided.

When mid/side coding is employed, it is possible to encode the side signals in different ways.

According to a first group of embodiments, a side signal S is encoded in the same way as a mid signal M. Quantization is conducted, but no further steps are conducted to reduce the bit rate that may be used. In general, such an approach aims to allow a quite precise reconstruction of the side signal S on the decoder side, but, on the other hand involves a large amount of bits for encoding.

According to a second group of embodiments, a residual side signal $S_{res}$ is generated from the original side signal S based on the M signal. In an embodiment, the residual side signal may, for example, be calculated according to the formula:

$$S_{res} = S - g \cdot M.$$

Other embodiments may, e.g., employ other definitions for the residual side signal.

The residual signal $S_{res}$ is quantized and transmitted to the decoder together with parameter g. By quantizing the residual signal $S_{res}$ instead of the original side signal S, in general, more spectral values are quantized to zero. This, in general, saves the amount of bits that may be used for encoding and transmitting compared to the quantized original side signal S.

In some of these embodiments of the second group of embodiments, a single parameter g is determined for the complete spectrum and transmitted to the decoder. In other embodiments of the second group of embodiments, each of a plurality of frequency bands/spectral bands of the frequency spectrum may, e.g., comprise two or more spectral values, and a parameter g is determined for each of the frequency bands/spectral bands and transmitted to the decoder.

Figure 12:
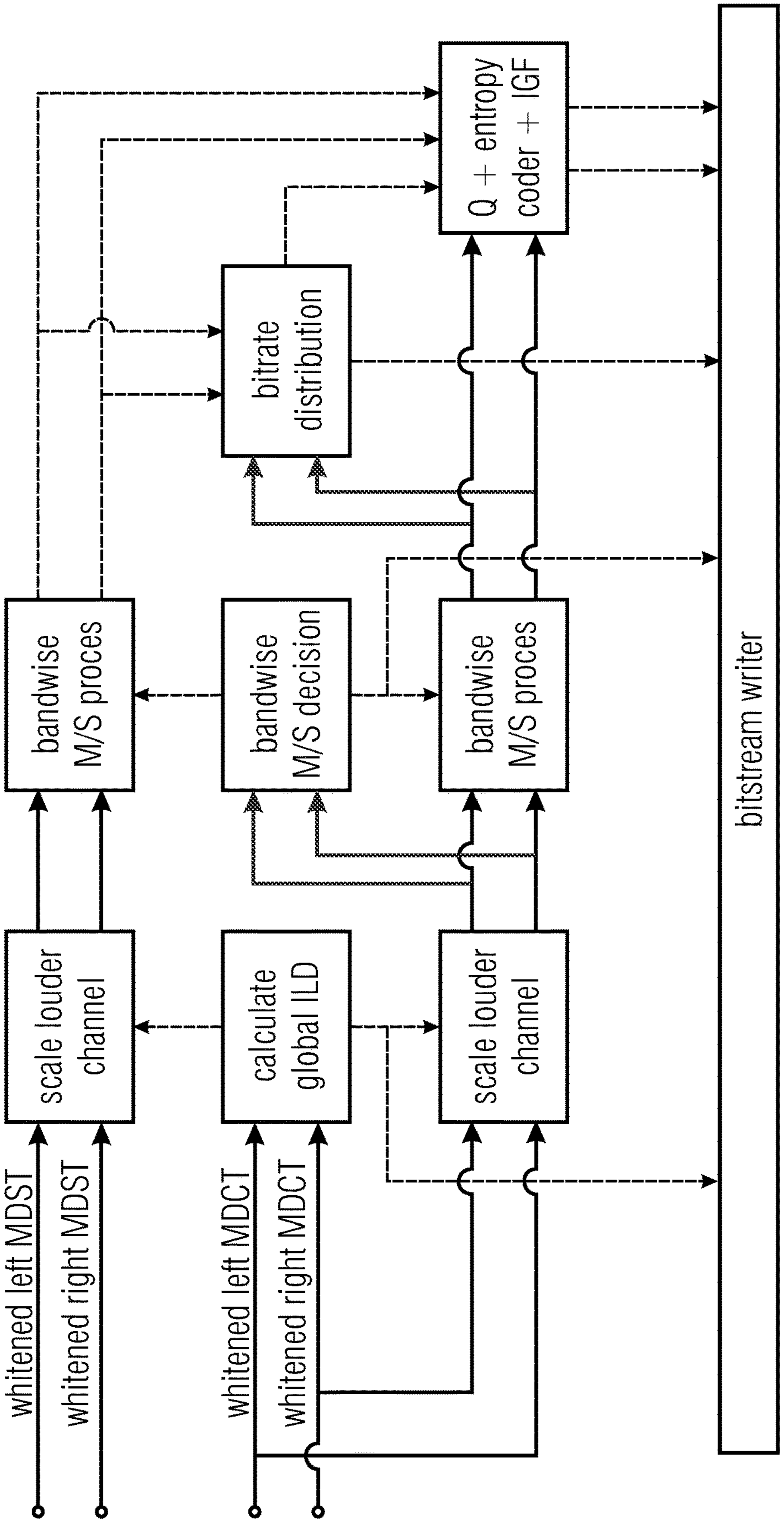
FIG. 12 illustrates stereo filling of a side signal on a decoder side according to some particular embodiments.

FIG. 12 illustrates stereo processing of an encoder side according to the first or the second groups of embodiments, which do not employ stereo filling.

Figure 13:
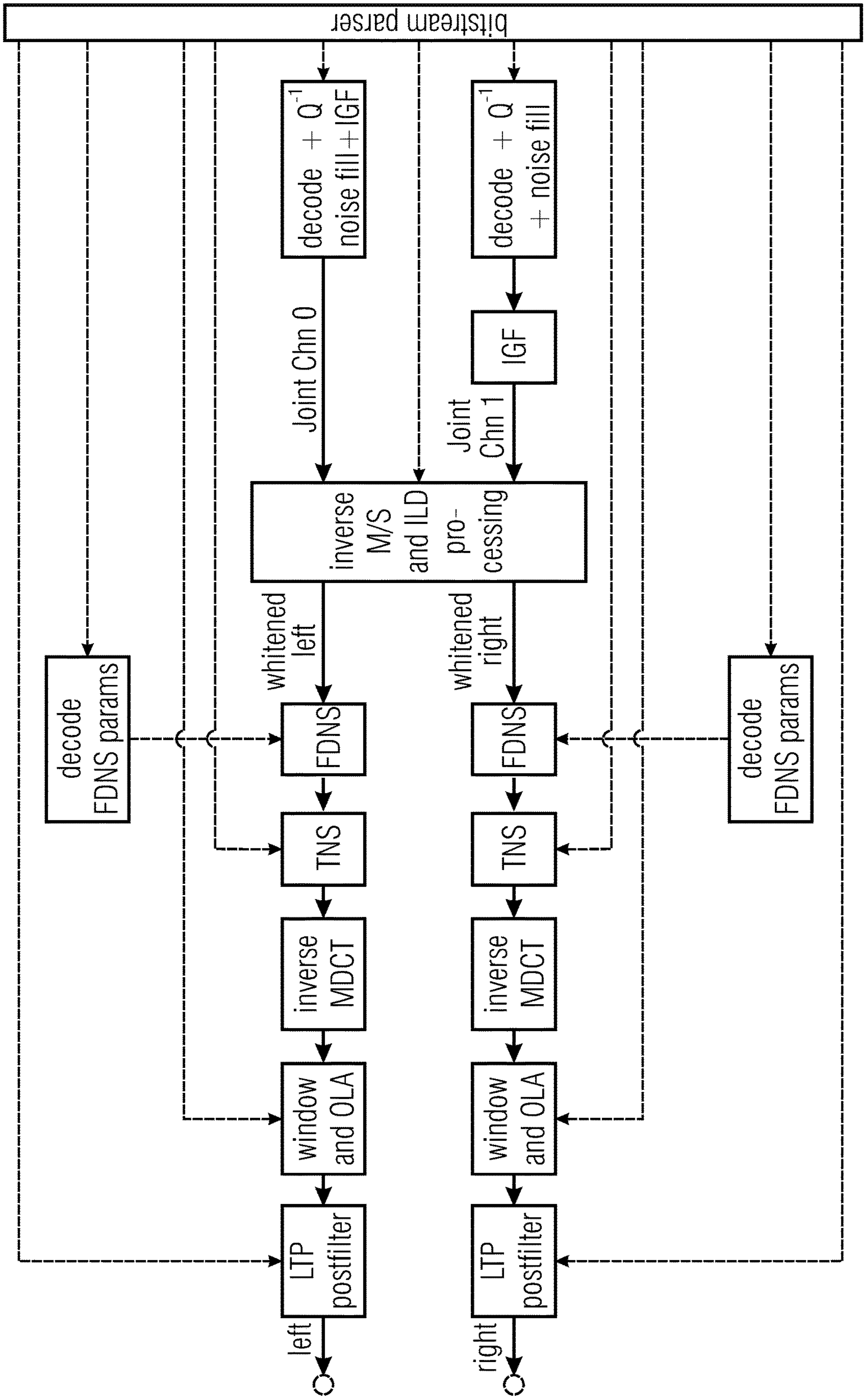
FIG. 13 illustrates stereo processing of a decoder side according to embodiments, which do not employ stereo filling.

FIG. 13 illustrates stereo processing of a decoder side according to the first or the second groups of embodiments, which do not employ stereo filling.

According to a third group of embodiments, stereo filling is employed. In some of these embodiments, on the decoder side, the side signal S for a certain point-in-time t is generated from a mid signal of the immediately preceding point-in-time t−1.

Generating the side signal S for a certain point-in-time t from a mid signal of the immediately preceding point-in-time t−1 on the decoder side may, for example, be conducted according to the formula:

$$S(t) = h_b \cdot M(t-1).$$

On the encoder side, the parameter $h_b$ is determined for each frequency band of a plurality of frequency bands of the spectrum. After determining the parameters $h_b$, the encoder transmits the parameters $h_b$ to the decoder. In some embodiments, the spectral values of the side signal S itself or of a residual of it are not transmitted to the decoder, Such an approach aims to save the number of bits that may be used.

In some other embodiments of the third group of embodiments, at least for those frequency bands where the side signal is louder than the mid signal, the spectral values of the side signal of those frequency bands are explicitly encoded and sent to the decoder.

According to a fourth group of embodiments, some of the frequency bands of the side signal S are encoded by explicitly encoding the original side signal S (see the first group of embodiment) or a residual side signal $S_{res}$, while for the other frequency bands, stereo filling is employed. Such an approach combines the first or the second groups of embodiments, with the third group of embodiments, which employs stereo filling. For example, lower frequency bands may, e.g., be encoded by quantizing the original side signal S or the residual side signal $S_{res}$, while for the other, upper frequency bands, stereo filling may, e.g., be employed.

Figure 9:
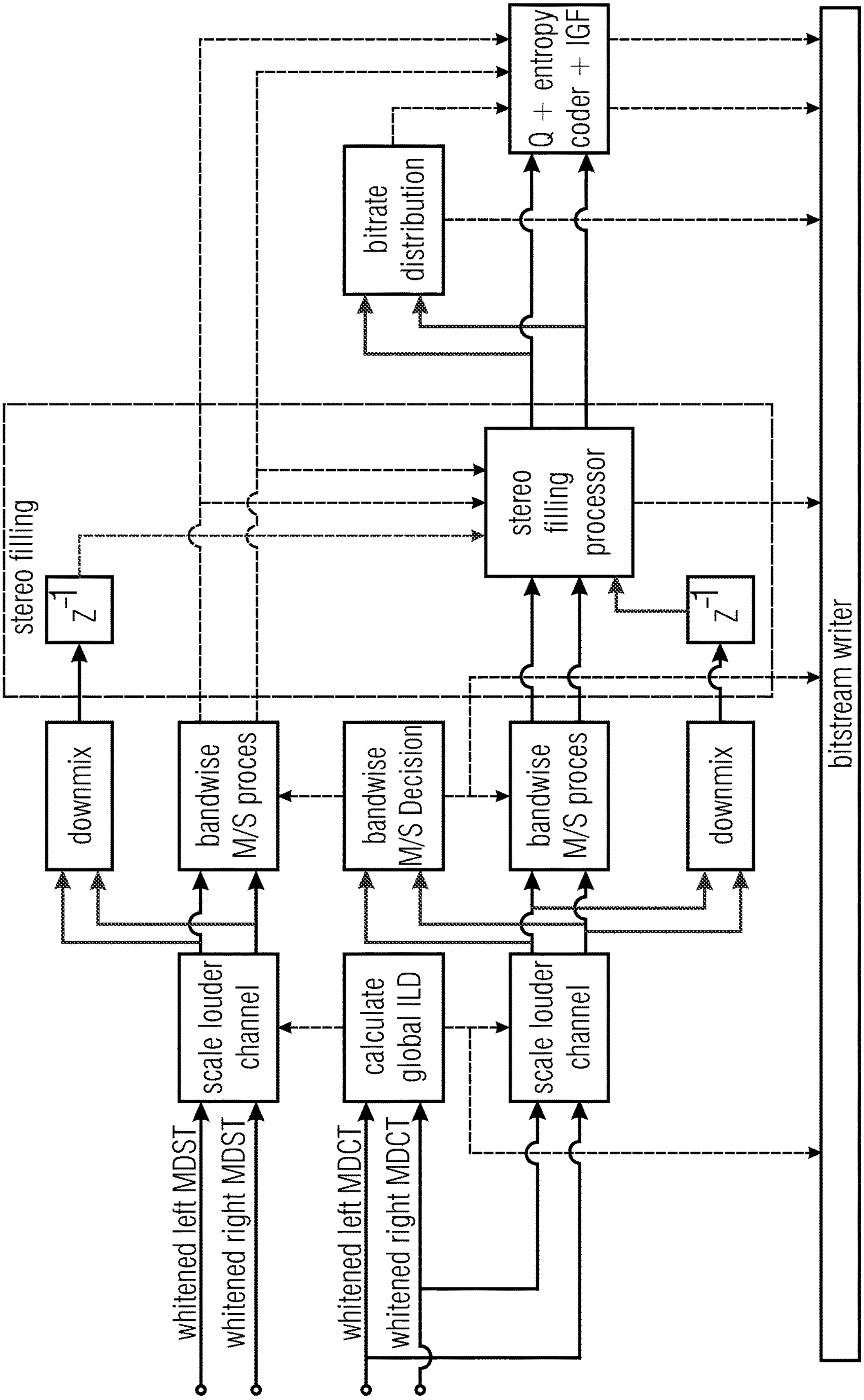
FIG. 9 illustrates stereo processing of an encoder side according to embodiments, which employ stereo filling.

FIG. 9 illustrates stereo processing of an encoder side according to the third or the fourth groups of embodiments, which employ stereo filling.

Figure 10:
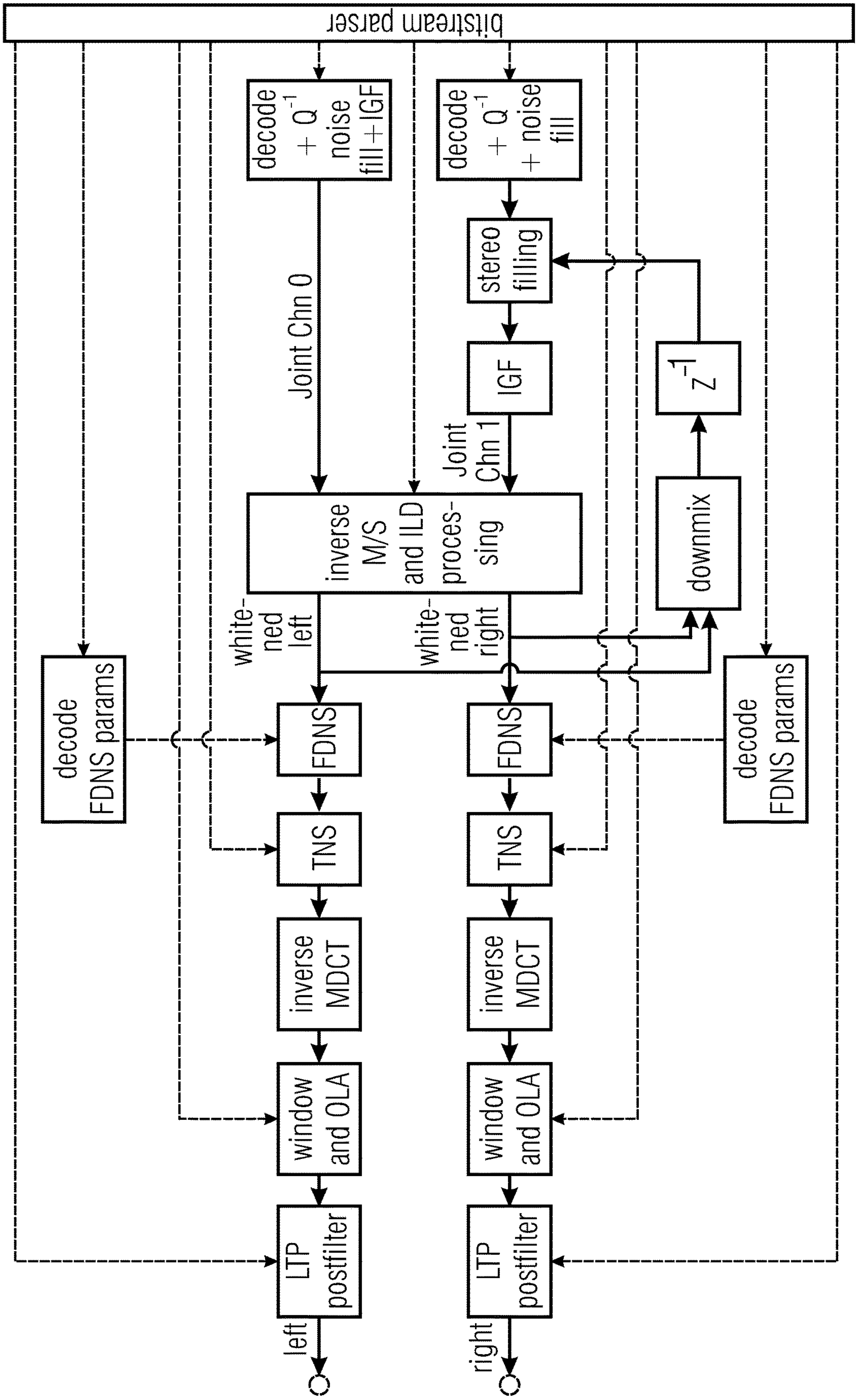
FIG. 10 illustrates stereo processing of a decoder side according to embodiments, which employ stereo filling.

FIG. 10 illustrates stereo processing of a decoder side according to the third or the fourth groups of embodiments, which employ stereo filling.

Those of the above-described embodiments, which do employ stereo filling, may, for example, employ stereo filling as described in in MPEG-H, see MPEG-H frequency-domain stereo (see, for example, [11]).

Some of the embodiments, which employ stereo filling, may, for example, apply the stereo filling algorithm described in on systems where the spectral envelope is coded as LSF combined with noise filling. Coding the spectral envelope, may, for example, be implemented as for example, described in [6a], [6b], [8]. Noise filling, may, for example, be implemented as described in [6a] and [6b].

In some particular embodiments, stereo-filling processing including stereo filling parameter calculation may, e.g., be conducted in the M/S bands within the frequency region, for example, from a lower frequency, such as 0.08 $F_s$ ($F_s$=sampling frequency), to, for example, an upper frequency, for example, the IGF cross-over frequency.

For example, for frequency portions lower than the lower frequency (e.g., 0.08 $F_s$), the original side signal S or a residual side signal derived from the original side signal S, may, e.g., be quantized and transmitted to the decoder. For frequency portions greater than the upper frequency (e.g., the IGF cross-over frequency), Intelligent Gap Filling (IGF) may, e.g., be conducted.

More particularly, in some of the embodiments, the side channel (the second channel), for those frequency bands within the stereo filling range (for example, 0.08 times the sampling frequency up to the IGF cross-over frequency) that are fully quantized to zero, may, for example, be filled using a "copy-over" from the previous frame's whitened MDCT spectrum downmix (IGF=Intelligent Gap Filling). The "copy-over" may, for example, be applied complimentary to the noise filling and scaled accordingly depending on the correction factors that are sent from the encoder. In other embodiments, the lower frequency may exhibit other values than 0.08 $F_s$.

Instead of being 0.08 $F_s$, in some embodiments, the lower frequency may, e.g., be a value in the range from 0 to 0.50 $F_s$ In particular, embodiments, the lower frequency may be a value in the range from 0.01 $F_s$ to 0.50 $F_s$. For example, the lower frequency may, e.g., be for example, 0.12 $F_s$ or 0.20 $F_s$ or 0.25 $F_s$.

In other embodiments, in addition to or instead of employing Intelligent Gap Filling, for frequencies greater than the upper frequency, Noise Filling may, e.g., be conducted.

In further embodiments, there is no upper frequency and stereo filling is conducted for each frequency portion greater than the lower frequency.

In still further embodiments, there is no lower frequency, and stereo filling is conducted for frequency portions from the lowest frequency band up to the upper frequency.

In still further embodiments, there is no lower frequency and no upper frequency and stereo filling is conducted for the whole frequency spectrum.

In the following, particular embodiments, which employ stereo filling, are described.

In particular, stereo filling with correction factors according to particular embodiments is described. Stereo Filling with correction factors may, e.g., be employed in the embodiments of the stereo filling processing blocks of FIG. 9 (encoder side) and of FIG. 10 (decoder side).

In the following, $Dmx_R$ may, e.g., denote the Mid signal of the whitened MDCT spectrum, $S_R$ may, e.g., denote the Side signal of the whitened MDCT spectrum, $DMX_I$ may, e.g., denote the Mid signal of the whitened MDST spectrum, $S_I$ may, e.g., denote the Side signal of the whitened MDST spectrum, $prevDmx_R$ may, e.g., denote the Mid signal of whitened MDCT spectrum delayed by one frame, and $prevDmx_I$ may, e.g., denote the Mid signal of whitened MDST spectrum delayed by one frame.

Stereo filling encoding may be applied when the stereo decision is M/S for all bands (full M/S) or M/S for all stereo filling bands (bandwise M/S).

When it was determined to apply full dual-mono processing stereo filling is bypassed. Moreover, when L/R coding is chosen for some of the spectral bands (frequency bands), stereo filling is also bypassed for these spectral bands.

Now, particular embodiments employing stereo filling are considered. There, processing within the block may, e.g., be conducted as follows:

For the frequency bands (fb) that fall within the frequency region starting from the lower frequency (e.g., 0.08 $F_s$ ($F_s$=sampling frequency)), up to the upper frequency, (e.g., the IGF cross-over frequency):

A residual $Res_R$ of the side signal $S_R$ is calculated, e.g., according to:

$$Res_R = S_R \quad a_R Dmx_R \quad a_I Dmx_I .$$

where $\alpha_R$ is the real part and $\alpha_I$ is the imaginary part of the complex prediction coefficient (see [10]).

A residual $Res_I$ of the side signal $S_I$ is calculated, e.g., according to:

$$Res_I = S_I - a_R Dmx_R - a_I Dmx_i .$$

Energies, e.g., complex-valued energies, of the residual Res and of the previous frame downmix (mid signal) prevDmx are calculated:

$$ERes_{fb} = \sum_{fb} Res_R^2 + \sum_{fb} Res_I^2,$$

$$EprevDmx_{fb} = \sum_{fb} prevDmx_R^2 + \sum_{fb} prevDmx_I^2$$

In the above formulae:

$$\sum_{fb} Res_R^2$$

sums the squares of all spectral values within frequency band fb of $Res_R$.

$$\sum_{fb} Res_I^2$$

sums the squares of all spectral values within frequency band fb of $Res_I$.

$$\sum_{fb} prevDmx_R^2$$

sums the squares of all spectral values within frequency band fb of $prevDmx_R$.

$$\sum_{fb} prevDmx_I^2$$

sums the squares of all spectral values within frequency band fb of $prevDmx_I$.

From these calculated energies, ($ERes_{fb}$, $EprevDmx_{fb}$), stereo filling correction factors are calculated and transmitted as side information to the decoder:

$$\text{correction\_factor}_{fb} - ERes_{fb} / (EprevDmx_{fb} + c)$$

In an embodiment, $\epsilon$=0. In other embodiments, e.g., $0.1 > \epsilon > 0$, e.g., to avoid a division by 0.

A band-wise scaling factor may, e.g., be calculated depending on the calculated stereo filling correction factors, e.g., for each spectral band, for which stereo filling is employed. Band-wise scaling of output Mid and Side (residual) signals by a scaling factor is introduced in order to compensate for energy loss, as there is no inverse complex prediction operation to reconstruct the side signal from the residual on the decoder side ($\alpha_R = \alpha_I = 0$).

In a particular embodiment, the band-wise scaling factor, may, e.g., be calculated according to:

$$\text{scaling\_factor}_{fb} = \sqrt{\frac{\sum_{fb}(S_R - a_R Dmx_R)^2 + \sum_{fb}(S_I - a_I Dmx_I)^2 + EDmx_{fb}}{ERes_{fb} + EDmx_{fb} + \varepsilon}}$$

where $EDmx_{fb}$ is the (e.g., complex) energy of the current frame downmix (which may, e.g., be calculated as described above).

In some embodiments, after the stereo filling processing in the stereo processing block and prior to quantization, the bins of the residual that fall within the stereo filling frequency range may, e.g., be set to zero, if for the equivalent band the downmix (Mid) is louder than the residual (Side):

$$\frac{E_{fb}^M}{E_{fb}^S} > \text{threshold}$$

$$E_{fb}^M = \sum_{fb} Dmx_R^2$$

$$E_{fb}^S = \sum_{fb} Res_R^2$$

Therefore, more bits are spent on coding the downmix and the lower frequency bins of the residual, improving the overall quality.

In alternative embodiments, all bits of the residual (Side) may, e.g., be set to zero. Such alternative embodiments may, e.g., be based on the assumption that the downmix is in most cases louder than the residual.

Figure 11:
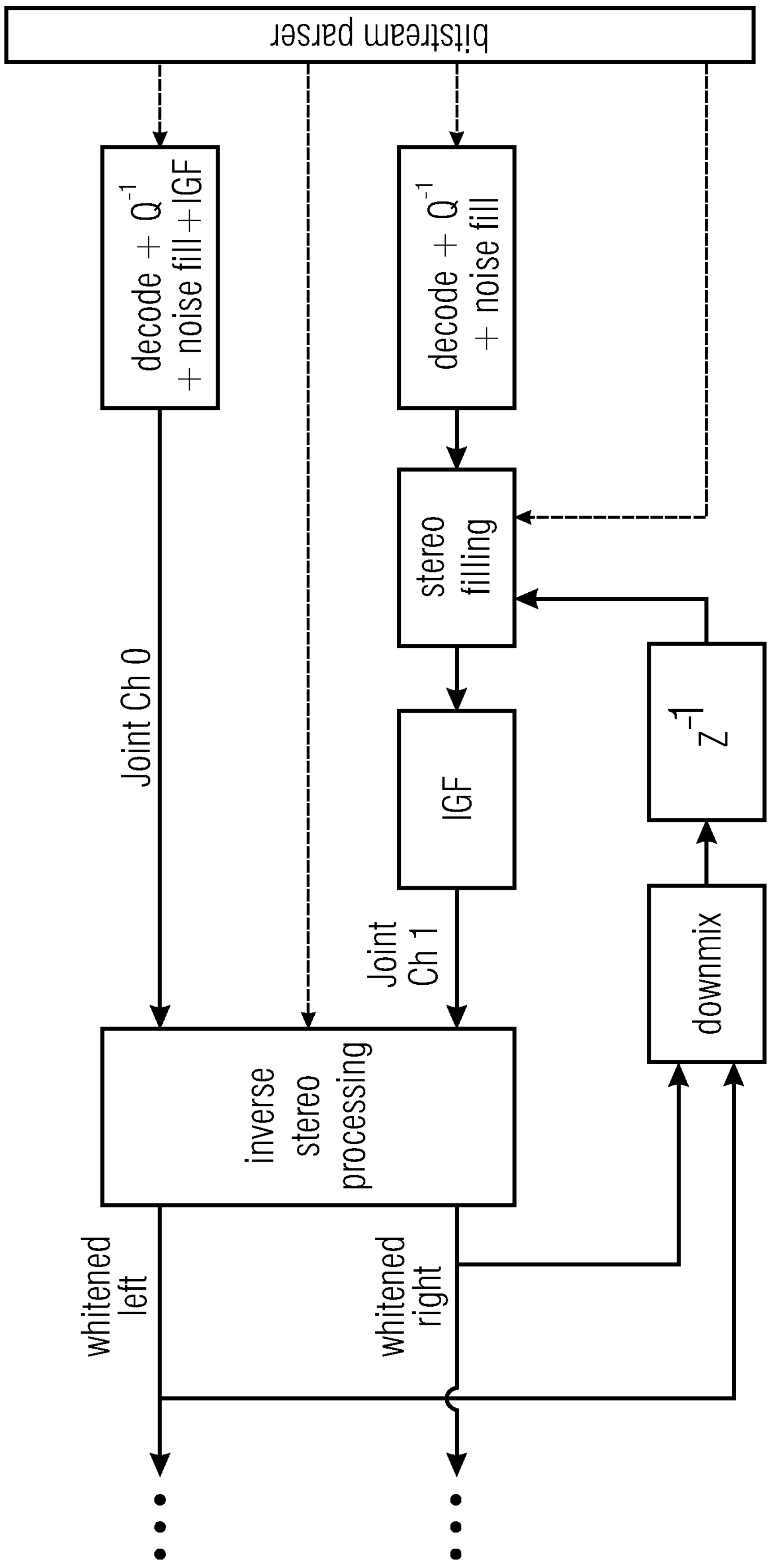
FIG. 11 illustrates stereo processing of an encoder side according to embodiments, which do not employ stereo filling.

FIG. 11 illustrates stereo filling of a side signal according to some particular embodiments on the decoder side.

Stereo filling is applied on the side channel after decoding, inverse quantization and noise filling. For the frequency bands, within the stereo filling range, that are quantized to zero, a "copy-over" from the last frame's whitened MDCT spectrum downmix may, e.g., be applied (as seen in FIG. 11), if the band energy after noise filling does not reach the target energy. The target energy per frequency band is calculated from the stereo correction factors that are sent as parameters from the encoder, for example according to the formula.

$$ET_{fb} = \text{correction\_factor}_{fb} \cdot EprevDmx_{fb}.$$

The generation of the side signal on the decoder side (which may, e.g, be referred to as a previous downmix "copy-over") is conducted, for example according to the formula:

$$S_i = N_i + facDmx_{fb} \cdot prevDmx_i,\ i \in [fb, fb+1],$$

where i denotes the frequency bins (spectral values) within the frequency band fb, N is the noise filled spectrum and $facDmx_{fb}$ is a factor that is applied on the previous downmix, that depends on the stereo filling correction factors sent from the encoder.

$facDmx_{fb}$ may, in a particular embodiment, e.g., be calculated for each frequency band fb as:

$$facDmx_{fb} = \sqrt{\text{correction\_factor}_{fb} - EN_{fb} \big/ \left(EprevDmx_{fb} + \varepsilon\right)}$$

where $EN_{fb}$ is the energy of the noise-filled spectrum in band fb and $EprevDmx_{fb}$, is the respective previous frame downmix energy.

On the encoder side, alternative embodiments do not take the MDST spectrum (or the MDCT spectrum) into account. In those embodiments, the proceeding on the encoder side is adapted, for example, as follows:

For the frequency bands (fb) that fall within the frequency region starting from the lower frequency (e.g., 0.08 $F_s$ ($F_s$=sampling frequency)), up to the upper frequency, (e.g., the IGF cross-over frequency):

A residual Res of the side signal $S_R$ is calculated, e.g., according to:

$$Res = S_R - a_R Dmx_R,$$

where $\alpha_R$ is a (e.g., real) prediction coefficient.

Energies of the residual Res and of the previous frame downmix (mid signal) prevDmx are calculated:

$$ERes_{fb} = \sum\nolimits_{fb} Res_R^2,$$

$$EprevDmx_{fb} = \sum_{fb} prevDmx_R^2.$$

From these calculated energies, ($ERes_{fb}$, $EprevDmx_{fb}$), stereo filling correction factors are calculated and transmitted as side information to the decoder:

$$\text{correction\_factor}_{fb} = ERes_{fb} \big/ \left(EprevDmx_{fb} + \varepsilon\right)$$

In an embodiment, ϵ=0. In other embodiments, e.g., 0.1>ϵ>0, e.g., to avoid a division by 0.

A band-wise scaling factor may, e.g., be calculated depending on the calculated stereo filling correction factors, e.g., for each spectral band, for which stereo filling is employed.

In a particular embodiment, the band-wise scaling factor, may, e.g., be calculated according to:

$$\text{scaling\_factor}_{fb} = \sqrt{\frac{\sum_{fb} (S_R - a_R Dmx_R)^2 + EDmx_{fb}}{ERes_{fb} + EDmx_{fb} + \varepsilon}}$$

where $EDmx_{fb}$ is the energy of the current frame downmix (which may, e.g., be calculated as described above).

In some embodiments, after the stereo filling processing in the stereo processing block and prior to quantization, the bins of the residual that fall within the stereo filling frequency range may, e.g., be set to zero, if for the equivalent band the downmix (Mid) is louder than the residual (Side):

$$\frac{E_{fb}^M}{E_{fb}^S} > \text{threshold}$$

$$E_{fb}^M = \sum_{fb} Dmx_R^2$$

$$E_{fb}^R = \sum_{fb} Res_R^2$$

Therefore, more bits are spent on coding the downmix and the lower frequency bins of the residual, improving the overall quality.

In alternative embodiments, all bits of the residual (Side) may, e.g., be set to zero. Such alternative embodiments may, e.g., be based on the assumption that the downmix is in most cases louder than the residual.

According to some of the embodiments, means may, e.g., be provided to apply stereo filling in systems with FDNS, where spectral envelope is coded using LSF (or a similar coding where it is not possible to independently change scaling in single bands).

According to some of the embodiments, means may, e.g., be provided to apply stereo filling in systems without the complex/real prediction.

Some of the embodiments may, e.g., employ parametric stereo filling, in the sense that explicit parameters (stereo filling correction factors) are sent from encoder to decoder, to control the stereo filling (e.g. with the downmix of the previous frame) of the whitened left and right MDCT spectrum.

In more general:

In some of the embodiments, the encoding unit 120 of FIG. 1*a*-FIG. 1*e* may, e.g., be configured to generate the processed audio signal, such that said at least one spectral band of the first channel of the processed audio signal is said spectral band of said mid signal, and such that said at least one spectral band of the second channel of the processed audio signal is said spectral band of said side signal. To obtain the encoded audio signal, the encoding unit 120 may, e.g., be configured to encode said spectral band of said side signal by determining a correction factor for said spectral band of said side signal. The encoding unit 120 may, e.g., be configured to determine said correction factor for said spectral band of said side signal depending on a residual and depending on a spectral band of a previous mid signal, which corresponds to said spectral band of said mid signal, wherein the previous mid signal precedes said mid signal in time. Moreover, the encoding unit 120 may, e.g., be configured to determine the residual depending on said spectral band of said side signal, and depending on said spectral band of said mid signal.

According to some of the embodiments, the encoding unit 120 may, e.g., be configured to determine said correction factor for said spectral band of said side signal according to the formula $$\text{correction\_factor}_{fb} = ERes_{fb} / (EprevDmx_{fb} + \varepsilon)$$

wherein $\text{correction\_factor}_{fb}$ indicates said correction factor for said spectral band of said side signal, wherein $ERes_{fb}$ indicates a residual energy depending on an energy of a spectral band of said residual, which corresponds to said spectral band of said mid signal, wherein $EprevDmx_{fb}$ indicates a previous energy depending on an energy of the spectral band of the previous mid signal, and wherein $\epsilon=0$, or wherein $0.1>\epsilon>0$.

In some of the embodiments, said residual may, e.g., be defined according to $$Res = S_R - a_R Dmx_R,$$

wherein $Res_R$ is said residual, wherein $S_R$ is said side signal, wherein $\alpha_R$ is a (e.g., real) coefficient (e.g., a prediction coefficient), wherein $Dmx_R$ is said mid signal, wherein the encoding unit (120) is configured to determine said residual energy according to $$ERes_{fb} = \sum\nolimits_{fb} Res_R^2.$$

According to some of the embodiments, said residual is defined according to $$Res_R = S_R - a_R Dmx_R - a_I Dmx_I,$$

wherein $Res_R$ is said residual, wherein $S_R$ is said side signal, wherein $\alpha_R$ is a real part of a complex (prediction) coefficient, and wherein $\alpha_I$ is an imaginary part of said complex (prediction) coefficient, wherein $Dmx_R$ is said mid signal, wherein $Dmx_I$ is another mid signal depending on the first channel of the normalized audio signal and depending on the second channel of the normalized audio signal, wherein another residual of another side signal $S_I$ depending on the first channel of the normalized audio signal and depending on the second channel of the normalized audio signal is defined according to $$Res_I = S_I - a_R Dmx_R - a_I Dmx_I,$$

wherein the encoding unit 120 may, e.g., be configured to determine said residual energy according to $$ERes_{fb} = \sum\nolimits_{fb} Res_R^2 + \sum\nolimits_{fb} Res_I^2$$

wherein the encoding unit 120 may, e.g., be configured to determine the previous energy depending on the energy of the spectral band of said residual, which corresponds to said spectral band of said mid signal, and depending on an energy of a spectral band of said another residual, which corresponds to said spectral band of said mid signal.

In some of the embodiments, the decoding unit 210 of FIG. 2*a*-FIG. 2*e* may, e.g., be configured to determine for each spectral band of said plurality of spectral bands, whether said spectral band of the first channel of the encoded audio signal and said spectral band of the second channel of the encoded audio signal was encoded using dual-mono encoding or using mid-side encoding. Moreover, the decoding unit 210 may, e.g., be configured to obtain said spectral band of the second channel of the encoded audio signal by reconstructing said spectral band of the second channel. If mid-side encoding was used, said spectral band of the first channel of the encoded audio signal is a spectral band of a mid signal, and said spectral band of the second channel of the encoded audio signal is spectral band of a side signal. Moreover, if mid-side encoding was used, the decoding unit 210 may, e.g., be configured to reconstruct said spectral band of the side signal depending on a correction factor for said spectral band of the side signal and depending on a spectral band of a previous mid signal, which corresponds to said spectral band of said mid signal, wherein the previous mid signal precedes said mid signal in time.

According to some of the embodiments, if mid-side encoding was used, the decoding unit 210 may, e.g., be configured to reconstruct said spectral band of the side signal, by reconstructing spectral values of said spectral band of the side signal according to $$S_i = N_i + facDmx_{fb} \cdot prevDmx_i$$

wherein $S_i$ indicates the spectral values of said spectral band of the side signal, wherein $prevDmx_i$ indicates spectral values of the spectral band of said previous mid signal, wherein $N_i$ indicates spectral values of a noise filled spectrum, wherein $facDmx_{fb}$ is defined according to $$facDmx_{fb} = \sqrt{\text{correction\_factor}_{fb} - EN_{fb} / (EprevDmx_{fb} + c)}$$

wherein $\text{correction\_factor}_{fb}$ is said correction factor for said spectral band of the side signal, wherein $EN_{fb}$ is an energy of the noise-filled spectrum, wherein Epre- $vDmx_{fb}$ is an energy of said spectral band of said previous mid signal, and wherein $\epsilon=0$, or wherein $0.1>\epsilon>0$.

In some of the embodiments, a residual may, e.g., be derived from complex stereo prediction algorithm at encoder, while there is no stereo prediction (real or complex) at decoder side.

According to some of the embodiments, energy correcting scaling of the spectrum at encoder side may, e.g., be used, to compensate for the fact that there is no inverse prediction processing at decoder side.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] J. Herre, E. Eberlein and K. Brandenburg, "Combined Stereo Coding," in 93rd AES Convention, San Francisco, 1992.

[2] J. D. Johnston and A. J. Ferreira, "Sum-difference stereo transform coding," in Proc. ICASSP, 1992.

[3] ISO/IEC 11172-3, Information technology—Coding of moving pictures and associated audio for digital storage media at up to about 1.5 Mbit/s—Part 3: Audio, 1993.

[4] ISO/IEC 13818-7, Information technology—Generic coding of moving pictures and associated audio information—Part 7: Advanced Audio Coding (AAC), 2003.

[5] J.-M. Valin, G. Maxwell, T. B. Terriberry and K. Vos, "High-Quality, Low-Delay Music Coding in the Opus Codec," in Proc. AES 135th Convention, New York, 2013.

[6a] 3GPP TS 26.445, Codec for Enhanced Voice Services (EVS); Detailed algorithmic description, V 12.5.0, Dezember 2015.

[6b] 3GPP TS 26.445, Codec for Enhanced Voice Services (EVS); Detailed algorithmic description, V 13.3.0, September 2016.

[7] H. Purnhagen, P. Carlsson, L. Villemoes, J. Robilliard, M. Neusinger, C. Helmrich, J. Hilpert, N. Rettelbach, S. Disch and B. Edler, "Audio encoder, audio decoder and related methods for processing multi-channel audio signals using complex prediction". U.S. Pat. No. 8,655,670 B2, 18 February 2014.

[8] G. Markovic, F. Guillaume, N. Rettelbach, C. Helmrich and B. Schubert, "Linear prediction based coding scheme using spectral domain noise shaping". European Patent 2676266 B1, 14 February 2011.

[9] S. Disch, F. Nagel, R. Geiger, B. N. Thoshkahna, K. Schmidt, S. Bayer, C. Neukam, B. Edler and C. Helmrich, "Audio Encoder, Audio Decoder and Related Methods Using Two-Channel Processing Within an Intelligent Gap Filling Framework". International Patent PCT/EP2014/065106, 15 07 2014.

[10] C. Helmrich, P. Carlsson, S. Disch, B. Edler, J. Hilpert, M. Neusinger, H. Purnhagen, N. Rettelbach, J. Robilliard and L. Villemoes, "Efficient Transform Coding Of Two-channel Audio Signals By Means Of Complex-valued Stereo Prediction," in Acoustics, Speech and Signal Processing (ICASSP), 2011 IEEE International Conference on, Prague, 2011.

[11] C. R. Helmrich, A. Niedermeier, S. Bayer and B. Edler, "Low-complexity semi-parametric joint-stereo audio transform coding," in Signal Processing Conference (EUSIPCO), 2015 23rd European, 2015.

[12] H. Malvar, "A Modulated Complex Lapped Transform and its Applications to Audio Processing" in Acoustics, Speech, and Signal Processing (ICASSP), 1999. Proceedings., 1999 IEEE International Conference on, Phoenix, AZ, 1999.

[13] B. Edler and G. Schuller, "Audio coding using a psychoacoustic pre- and post-filter," Acoustics, Speech, and Signal Processing, 2000. ICASSP '00.

The invention claimed is:

1. An apparatus for encoding a first channel and a second channel of an audio input signal comprising two or more channels to acquire an encoded audio signal, wherein the apparatus comprises:

a normalizer configured to determine a first channel and a second channel of a normalized audio signal by modifying, depending on a normalization value, at least one of the first channel and the second channel of the audio input signal, an encoding unit being configured to generate a processed audio signal comprising a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal obtained by processing a spectral band of the first channel of the normalized audio signal and a spectral band of the second channel of the normalized audio signal, and such that at least one spectral band of the second channel of the processed audio signal is a spectral band of a side signal obtained by processing a spectral band of the first channel of the normalized audio signal and a spectral band of the second channel of the normalized audio signal, wherein the encoding unit is configured to encode the processed audio signal to acquire the encoded audio signal.

2. An apparatus according to claim 1, wherein the encoding unit is configured to choose between a full-mid-side encoding mode and a full-dual-mono encoding mode and a band-wise encoding mode depending on a plurality of spectral bands of the first channel of the normalized audio signal and depending on a plurality of spectral bands of the second channel of the normalized audio signal, wherein the encoding unit is configured, if the full-mid-side encoding mode is chosen, to generate a mid signal from the first channel and from the second channel of the normalized audio signal as a first channel of a mid-side signal, to generate a side signal from the first channel and from the second channel of the normalized audio signal as a second channel of the mid-side signal, and to encode the mid-side signal to acquire the encoded audio signal, wherein the encoding unit is configured, if the full-dual-mono encoding mode is chosen, to encode the normalized audio signal to acquire the encoded audio signal, and wherein the encoding unit is configured, if the band-wise encoding mode is chosen, to generate the processed audio signal, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal obtained by processing a spectral band of the first channel of the normalized audio signal and a spectral band of the second channel of the normalized audio signal, and such that at least one spectral band of the second channel of the processed audio signal is a spectral band of a side signal obtained by processing a spectral band of the first channel of the normalized audio signal and a spectral band of the second channel of the normalized audio signal, wherein the encoding unit is configured to encode the processed audio signal to acquire the encoded audio signal.

3. An apparatus according to claim 2, wherein the encoding unit is configured, if the band-wise encoding mode is chosen, to decide for each spectral band of a plurality of spectral bands of the processed audio signal, whether the mid-side encoding is employed or whether the dual-mono encoding is employed, wherein, if the mid-side encoding is employed for the spectral band, the encoding unit is configured to generate the spectral band of the first channel of the processed audio signal as a spectral band of the mid signal based on the spectral band of the first channel of the normalized audio signal and based on the spectral band of the second channel of the normalized audio signal, and the encoding unit is configured to generate the spectral band of the second channel of the processed audio signal as a spectral band of the side signal based on the spectral band of the first channel of the normalized audio signal and based on the spectral band of the second channel of the normalized audio signal, and wherein, if the dual-mono encoding is employed for the spectral band, the encoding unit is configured to use the spectral band of the first channel of the normalized audio signal as the spectral band of the first channel of the processed audio signal, and is configured to use the spectral band of the second channel of the normalized audio signal as the spectral band of the second channel of the processed audio signal, or the encoding unit is configured to use the spectral band of the second channel of the normalized audio signal as the spectral band of the first channel of the processed audio signal, and is configured to use the spectral band of the first channel of the normalized audio signal as the spectral band of the second channel of the processed audio signal.

4. An apparatus according to claim 2, wherein the encoding unit is configured to choose between the full-mid-side encoding mode and the full-dual-mono encoding mode and the band-wise encoding mode by determining a first estimation estimating a first number of bits that are needed for encoding when the full-mid-side encoding mode is employed, by determining a second estimation estimating a second number of bits that are needed for encoding when the full-dual-mono encoding mode is employed, by determining a third estimation estimating a third number of bits that are needed for encoding when the band-wise encoding mode is employed, and by choosing that encoding mode among the full-mid-side encoding mode and the full-dual-mono encoding mode and the band-wise encoding mode that exhibits a smallest number of bits among the first estimation and the second estimation and the third estimation.

5. An apparatus according to claim 4, wherein the encoding unit is configured to estimate the third estimation $b_{BW}$, estimating the third number of bits that are needed for encoding when the band-wise encoding mode is employed, according to the formula:

$$b_{BW} = nBands + \sum_{i=0}^{nBands-1} \min\left(b^{i}_{bwLR}, b^{i}_{bwMS}\right),$$

wherein nBands is a number of spectral bands of the normalized audio signal, wherein $$b^{i}_{bwMS}$$

is an estimation for a number of bits that are needed for encoding an i-th spectral band of the mid signal and for encoding the i-th spectral band of the side signal, and wherein $$b^{i}_{bwLR}$$

is an estimation for a number of bits that are needed for encoding an i-th spectral band of a left signal and for encoding the i-th spectral band of a right signal.

6. An apparatus according to claim 2, wherein the encoding unit is configured to choose between the full-mid-side encoding mode and the full-dual-mono encoding mode and the band-wise encoding mode by determining a first estimation estimating a first number of bits that are saved when encoding in the full-mid-side encoding mode, by determining a second estimation estimating a second number of bits that are saved when encoding in the full-dual-mono encoding mode, by determining a third estimation estimating a third number of bits that are saved when encoding in the band-wise encoding mode, and by choosing that encoding mode among the full-mid-side encoding mode and the full-dual-mono encoding mode and the band-wise encoding mode that exhibits a greatest number of bits that are saved among the first estimation and the second estimation and the third estimation.

7. An apparatus according to claim 2, wherein the encoding unit is configured to choose between the full-mid-side encoding mode and the full-dual-mono encoding mode and the band-wise encoding mode by estimating a first signal-to-noise ratio that occurs when the full-mid-side encoding mode is employed, by estimating a second signal-to-noise ratio that occurs when the full-dual-mono encoding mode is employed, by estimating a third signal-to-noise ratio that occurs when the band-wise encoding mode is employed, and by choosing that encoding mode among the full-mid-side encoding mode and the full-dual-mono encoding mode and the band-wise encoding mode that exhibits a greatest signal-to-noise-ratio among the first signal-to-noise-ratio and the second signal-to-noise-ratio and the third signal-to-noise-ratio.

8. An apparatus according to claim 1, wherein the encoding unit is configured to generate the processed audio signal, such that the at least one spectral band of the first channel of the processed audio signal is the spectral band of the mid signal, and such that the at least one spectral band of the second channel of the processed audio signal is the spectral band of the side signal, wherein, to acquire the encoded audio signal, the encoding unit is configured to encode the spectral band of the side signal by determining a correction factor for the spectral band of the side signal, wherein the encoding unit is configured to determine the correction factor for the spectral band of the side signal depending on a residual and depending on a spectral band of a previous mid signal, which corresponds to the spectral band of the mid signal, wherein the previous mid signal precedes the mid signal in time, wherein the encoding unit is configured to determine the residual depending on the spectral band of the side signal, and depending on the spectral band of the mid signal.

9. An apparatus according to claim 8, wherein the encoding unit is configured to determine the correction factor for the spectral band of the side signal according to the formula $$\text{correction\_factor}_{fb} = ERes_{fb}/\left(EprevDmx_{fb} + \varepsilon\right)$$

wherein $\text{correction\_factor}_{fb}=ERes_{fb}/(EprevDmx_{fb}+\varepsilon)$ indicates the correction factor for the spectral band of the side signal, wherein $\text{correction\_factor}_{fb}=ERes_{fb}/(EprevDmx_{fb}+\varepsilon)$ indicates a residual energy depending on an energy of a spectral band of the residual, which corresponds to the spectral band of the mid signal, wherein $\text{correction\_factor}_{fb}=ERes_{fb}/(EprevDmx_{fb}+\varepsilon)$ indicates a previous energy depending on an energy of the spectral band of the previous mid signal, and wherein $\varepsilon=0$, or wherein $0.1>\varepsilon>0$.

10. An apparatus according to claim 8, wherein the residual is defined according to $$Res_R = S_R - a_R Dmx_R - a_i Dmx_i,$$

wherein $\mathrm{Res}_R$ is the residual, wherein $S_R$ is the side signal, wherein $a_R$ is a coefficient, wherein $\mathrm{Dmx}_R$ is the mid signal, wherein the encoding unit is configured to determine the residual energy according to $$ERes_{fb} = \sum\nolimits_{fb} Res_R^2 + \sum\nolimits_{fb} Res_I^2.$$

11. An apparatus according to claim 8, wherein the residual is defined according to $$Res_I = S_I - a_R Dmx_R - a_I Dmx_I,$$

wherein $\mathrm{Res}_I$ is the residual, wherein $S_I$ is the side signal, wherein $a_R$ is a real part of a complex coefficient, and wherein $a_I$ is an imaginary part of the complex coefficient, wherein $\mathrm{Dmx}_R$ is the mid signal, wherein $\mathrm{Dmx}_I$ is another mid signal depending on the first channel of the normalized audio signal and depending on the second channel of the normalized audio signal, wherein another residual of another side signal $S_I$ depending on the first channel of the normalized audio signal and depending on the second channel of the normalized audio signal is defined according to $$Res_I = S_I Res - S_R Dmx_R - a_I Dmx_I,$$

wherein the encoding unit is configured to determine a residual energy according to $$ERes_{fb} = \sum_{fb} Res_R^2 + \sum_{fb} Res_I^2$$

wherein the encoding unit is configured to determine a previous energy depending on the energy of the spectral band of the residual, which corresponds to the spectral band of the mid signal, and depending on an energy of a spectral band of the another residual, which corresponds to the spectral band of the mid signal.

12. An apparatus according to claim 1, wherein the normalizer is configured to determine the normalization value for the audio input signal depending on an energy of the first channel of the audio input signal and depending on an energy of the second channel of the audio input signal.

13. An apparatus according to claim 1, wherein the audio input signal is represented in a spectral domain, wherein the normalizer is configured to determine the normalization value for the audio input signal depending on a plurality of spectral bands of the first channel of the audio input signal and depending on a plurality of spectral bands of the second channel of the audio input signal, and wherein the normalizer is configured to determine the normalized audio signal by modifying, depending on the normalization value, the plurality of spectral bands of at least one of the first channel and the second channel of the audio input signal.

14. An apparatus according to claim 13, wherein the normalizer is configured to determine the normalization value based on the formulae:

$$NRG_L = \sqrt{\sum MDCT_{L,k}^2}$$

$$NRG_R = \sqrt{\sum MDCT_{R,k}^2}$$

$$ILD = \frac{NRG_L}{NRG_L + NRG_R}$$

wherein $\mathrm{MDCT}_{L,k}$ is a k-th coefficient of a Modified Discrete Cosine Transform (MDCT) spectrum of the first channel of the audio input signal, and $\mathrm{MDCT}_{R,k}$ is the k-th coefficient of the MDCT spectrum of the second channel of the audio input signal, and wherein the normalizer is configured to determine the normalization value by quantizing ILD, wherein $\mathrm{NRG}_L$ denotes an energy in a left channel, wherein $\mathrm{NRG}_R$ denotes an energy in a right channel, and wherein ILD denotes an interaural level difference.

15. An apparatus according to claim 13, wherein the apparatus for encoding further comprises a transform unit and a preprocessing unit, wherein the transform unit is configured to configured to transform a time-domain audio signal from a time domain to a frequency domain to acquire a transformed audio signal, wherein the preprocessing unit is configured to generate the first channel and the second channel of the audio input signal by applying an encoder-side frequency domain noise shaping operation on the transformed audio signal.

16. An apparatus according to claim 15, wherein the preprocessing unit is configured to generate the first channel and the second channel of the audio input signal by applying an encoder-side temporal noise shaping operation on the transformed audio signal before applying the encoder-side frequency domain noise shaping operation on the transformed audio signal.

17. An apparatus according to claim 1, wherein the normalizer is configured to determine the normalization value for the audio input signal depending on the first channel of the audio input signal being represented in a time domain and depending on the second channel of the audio input signal being represented in the time domain, wherein the normalizer is configured to determine the first channel and the second channel of the normalized audio signal by modifying, depending on the normalization value, at least one of the first channel and the second channel of the audio input signal being represented in the time domain, wherein the apparatus further comprises a transform unit being configured to transform the normalized audio signal from the time domain to a spectral domain so that the normalized audio signal is represented in the spectral domain, and wherein the transform unit is configured to feed the normalized audio signal being represented in the spectral domain into the encoding unit.

18. An apparatus according to claim 17, wherein the apparatus further comprises a preprocessing unit being configured to receive a time-domain audio signal comprising a first channel and a second channel, wherein the preprocessing unit is configured to apply a filter on the first channel of the time-domain audio signal that produces a first perceptually whitened spectrum to acquire the first channel of the audio input signal being represented in the time domain, and wherein the preprocessing unit is configured to apply the filter on the second channel of the time-domain audio signal that produces a second perceptually whitened spectrum to acquire the second channel of the audio input signal being represented in the time domain.

19. An apparatus according to claim 17, wherein the transform unit is configured to transform the normalized audio signal from the time domain to the spectral domain to acquire a transformed audio signal, wherein the apparatus furthermore comprises a spectral-domain preprocessor being configured to conduct encoder-side temporal noise shaping on the transformed audio signal to acquire the normalized audio signal being represented in the spectral domain.

20. An apparatus according to claim 1, wherein the encoding unit is configured to acquire the encoded audio signal by applying encoder-side Stereo Intelligent Gap Filling on the normalized audio signal or on the processed audio signal.

21. An apparatus according to claim 1, wherein the audio input signal is an audio stereo signal comprising exactly two channels.

22. A system for encoding four channels of an audio input signal comprising four or more channels to acquire an encoded audio signal, the system comprising:

a first apparatus for encoding a first channel and a second channel of the four or more channels of the audio input signal to acquire a first channel and a second channel of the encoded audio signal, and a second apparatus, wherein the first apparatus is configured for encoding a first channel and a second channel of the audio input signal, wherein the first apparatus comprises a normalizer configured to determine a first channel and a second channel of a normalized audio signal by modifying, depending on a normalization value, at least one of the first channel and the second channel of the audio input signal, wherein the first apparatus comprises an encoding unit being configured to generate a processed audio signal comprising a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal obtained by processing a spectral band of the first channel of the normalized audio signal and a spectral band of the second channel of the normalized audio signal, and such that at least one spectral band of the second channel of the processed audio signal is a spectral band of a side signal obtained by processing a spectral band of the first channel of the normalized audio signal and depending on a spectral band of the second channel of the normalized audio signal, wherein the encoding unit is configured to encode the processed audio signal to acquire the encoded audio signal, wherein the second apparatus is configured for encoding a third channel and a fourth channel of the four or more channels of the audio input signal to acquire a third channel and a fourth channel of the encoded audio signal.

23. An apparatus for decoding an encoded audio signal comprising a first channel and a second channel to acquire a first channel and a second channel of a decoded audio signal comprising two or more channels, wherein the apparatus comprises a decoding unit configured to determine for each spectral band of a plurality of spectral bands, whether the spectral band of the first channel of the encoded audio signal and the spectral band of the second channel of the encoded audio signal was encoded using dual-mono encoding or using mid-side encoding, wherein the decoding unit is configured to generate a spectral band of a first channel of an intermediate audio signal using the spectral band of the first channel of the encoded audio signal and using the spectral band of the second channel of the encoded audio signal, and to generate a spectral band of a second channel of the intermediate audio signal using the spectral band of the first channel of the encoded audio signal and using the spectral band of the second channel of the encoded audio signal, if the mid-side encoding was used, and wherein the apparatus comprises a de-normalizer configured to modify, depending on a de-normalization value, at least one of the first channel and the second channel of the intermediate audio signal to acquire the first channel and the second channel of the decoded audio signal, wherein the decoding unit is configured to determine for each spectral band of the plurality of spectral bands, whether the spectral band of the first channel of the encoded audio signal and the spectral band of the second channel of the encoded audio signal was encoded using the dual-mono encoding or using the mid-side encoding, wherein the decoding unit is configured to acquire the spectral band of the second channel of the encoded audio signal by reconstructing the spectral band of the second channel, wherein, if the mid-side encoding was used, the spectral band of the first channel of the encoded audio signal is a spectral band of a mid signal, and the spectral band of the second channel of the encoded audio signal is a spectral band of a side signal, wherein, if the mid-side encoding was used, the decoding unit is configured to reconstruct the spectral band of the side signal depending on a correction factor for the spectral band of the side signal and depending on a spectral band of a previous mid signal, which corresponds to the spectral band of the mid signal, wherein the previous mid signal precedes the mid signal in time.

24. An apparatus according to claim 23, wherein the decoding unit is configured to determine whether the encoded audio signal is encoded in a full-mid-side encoding mode or in a full-dual-mono encoding mode or in a band-wise encoding mode, wherein the decoding unit is configured, if it is determined that the encoded audio signal is encoded in the full-mid-side encoding mode, to generate the first channel of the intermediate audio signal from the first channel and from the second channel of the encoded audio signal, and to generate the second channel of the intermediate audio signal from the first channel and from the second channel of the encoded audio signal, wherein the decoding unit is configured, if it is determined that the encoded audio signal is encoded in the full-dual-mono encoding mode, to use the first channel of the encoded audio signal as the first channel of the intermediate audio signal, and to use the second channel of the encoded audio signal as the second channel of the intermediate audio signal, and wherein the decoding unit is configured, if it is determined that the encoded audio signal is encoded in the band-wise encoding mode, to determine for each spectral band of a plurality of spectral bands, whether the spectral band of the first channel of the encoded audio signal and the spectral band of the second channel of the encoded audio signal was encoded using the dual-mono encoding or using the mid-side encoding, to use the spectral band of the first channel of the encoded audio signal as a spectral band of the first channel of the intermediate audio signal and to use the spectral band of the second channel of the encoded audio signal as a spectral band of the second channel of the intermediate audio signal, if the dual-mono encoding was used, and to generate a spectral band of the first channel of the intermediate audio signal using the spectral band of the first channel of the encoded audio signal and using the spectral band of the second channel of the encoded audio signal, and to generate a spectral band of the second channel of the intermediate audio signal using the spectral band of the first channel of the encoded audio signal and using the spectral band of the second channel of the encoded audio signal, if the mid-side encoding was used.

25. An apparatus according to claim 23, wherein if the mid-side encoding was used, the decoding unit is configured to reconstruct the spectral band of the side signal, by reconstructing spectral values of the spectral band of the side signal according to $$S_i = N_i + facDmx_{fb} \cdot prevDmx_i,\ i \in [fb, fb+1],$$

wherein $S_i$ indicates the spectral values of the spectral band of the side signal, wherein $prevDmx_i$ indicates spectral values of the spectral band of the previous mid signal, wherein $N_i$ indicates spectral values of a noise filled spectrum, wherein $facDmx_{fb}$ is defined according to $$facDmx_{fb} = \text{correction\_factor}_{fb} - EN_{fb} / (EprevDmx_{fb} + \varepsilon)$$

wherein $\text{correction\_factor}_{fb}$ is the correction factor for the spectral band of the side signal, wherein $EN_{fb}$, is an energy of the noise-filled spectrum, wherein $EprevDmx_{fb}$ is an energy of the spectral band of the previous mid signal, and wherein ε=0, or wherein 0.1>ε>0.

26. An apparatus according to claim 23, wherein the de-normalizer is configured to modify, depending on the de-normalization value, the plurality of spectral bands of at least one of the first channel and the second channel of the intermediate audio signal to acquire the first channel and the second channel of the decoded audio signal.

27. An apparatus according to claim 23, wherein the de-normalizer is configured to modify, depending on the de-normalization value, the plurality of spectral bands of at least one of the first channel and the second channel of the intermediate audio signal to acquire a de-normalized audio signal, wherein the apparatus furthermore comprises a postprocessing unit and a transform unit, and wherein the postprocessing unit is configured to conduct at least one of decoder-side temporal noise shaping and decoder-side frequency domain noise shaping on the de-normalized audio signal to acquire a postprocessed audio signal, wherein the transform unit is configured to configured to transform the postprocessed audio signal from a spectral domain to a time domain to acquire the first channel and the second channel of the decoded audio signal.

28. An apparatus according to claim 23, wherein the apparatus further comprises a transform unit configured to transform the intermediate audio signal from a spectral domain to a time domain, wherein the de-normalizer is configured to modify, depending on the de-normalization value, at least one of the first channel and the second channel of the intermediate audio signal being represented in a time domain to acquire the first channel and the second channel of the decoded audio signal.

29. An apparatus according to claim 23, wherein the apparatus further comprises a transform unit configured to transform the intermediate audio signal from a spectral domain to a time domain, wherein the de-normalizer is configured to modify, depending on the de-normalization value, at least one of the first channel and the second channel of the intermediate audio signal being represented in a time domain to acquire a de-normalized audio signal, wherein the apparatus further comprises a postprocessing unit being configured to process the de-normalized audio signal, being a perceptually whitened audio signal, to acquire the first channel and the second channel of the decoded audio signal.

30. An apparatus according to claim 28, wherein the apparatus furthermore comprises a spectral-domain postprocessor being configured to conduct decoder-side temporal noise shaping on the intermediate audio signal, wherein the transform unit is configured to transform the intermediate audio signal from the spectral domain to the time domain, after decoder-side temporal noise shaping has been conducted on the intermediate audio signal.

31. An apparatus according to claim 23, wherein the decoding unit is configured to apply decoder-side Stereo Intelligent Gap Filling on the encoded audio signal.

32. An apparatus according to claim 23, wherein the decoded audio signal is an audio stereo signal comprising exactly two channels.

33. A system for decoding an encoded audio signal comprising four or more channels to acquire four channels of a decoded audio signal comprising four or more channels, wherein the system comprises a first and second apparatus for decoding a first channel and a second channel of the four or more channels of the encoded audio signal to acquire a first channel and a second channel of the decoded audio signal wherein the system comprises a second apparatus, wherein the first apparatus comprises a decoding unit configured to determine for each spectral band of a plurality of spectral bands, whether the spectral band of the first channel of the encoded audio signal and the spectral band of the second channel of the encoded audio signal was encoded using dual-mono encoding or using mid-side encoding, wherein the decoding unit of the first apparatus is configured to generate a spectral band of a first channel of an intermediate audio signal based on the spectral band of the first channel of the encoded audio signal and based on the spectral band of the second channel of the encoded audio signal, and to generate a spectral band of a second channel of the intermediate audio signal based on the spectral band of the first channel of the encoded audio signal and based on the spectral band of the second channel of the encoded audio signal, if the mid-side encoding was used, and wherein the first apparatus comprises a de-normalizer configured to modify, depending on a de-normalization value, at least one of the first channel and the second channel of the intermediate audio signal to acquire the first channel and the second channel of the decoded audio signal, wherein the decoding unit is configured to determine for each spectral band of the plurality of spectral bands, whether the spectral band of the first channel of the encoded audio signal and the spectral band of the second channel of the encoded audio signal was encoded using the dual-mono encoding or using the mid-side encoding, wherein the decoding unit of the first apparatus is configured to acquire the spectral band of the second channel of the encoded audio signal by reconstructing the spectral band of the second channel, wherein, if the mid-side encoding was used, the spectral band of the first channel of the encoded audio signal is a spectral band of a mid signal, and the spectral band of the second channel of the encoded audio signal is a spectral band of a side signal, wherein, if the mid-side encoding was used, the decoding unit of the first apparatus is configured to reconstruct the spectral band of the side signal depending on a correction factor for the spectral band of the side signal and depending on a spectral band of a previous mid signal, which corresponds to the spectral band of the mid signal, wherein the previous mid signal precedes the mid signal in time, and wherein the second apparatus is configured for decoding a third channel and a fourth channel of the four or more channels of the encoded audio signal to acquire a third channel and a fourth channel of the decoded audio signal.

34. A system for generating an encoded audio signal from an audio input signal, comprising:

an apparatus for encoding a first channel and a second channel of the audio input signal comprising two or more channels to acquire the encoded audio signal, the apparatus being configured to generate the encoded audio signal from the audio input signal and comprising:

a normalizer configured to determine a first channel and a second channel of a normalized audio signal by modifying, depending on a normalization value, at least one of the first channel and the second channel of the audio input signal, an encoding unit being configured to generate a processed audio signal comprising a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal obtained by processing a spectral band of the first channel of the normalized audio signal and a spectral band of the second channel of the normalized audio signal, and such that at least one spectral band of the second channel of the processed audio signal is a spectral band of a side signal obtained by processing a spectral band of the first channel of the normalized audio signal and a spectral band of the second channel of the normalized audio signal, wherein the encoding unit is configured to encode the processed audio signal to acquire the encoded audio signal.

35. A system for generating a decoded audio signal from an encoded audio signal, comprising:

an apparatus for decoding the encoded audio signal comprising a first channel and a second channel to acquire a first channel and a second channel of the decoded audio signal comprising two or more channels, the apparatus being configured to generate the decoded audio signal from the encoded audio signal and comprising a decoding unit configured to determine for each spectral band of a plurality of spectral bands, whether the spectral band of the first channel of the encoded audio signal and the spectral band of the second channel of the encoded audio signal was encoded using dual-mono encoding or using mid-side encoding, wherein the decoding unit is configured to generate a spectral band of a first channel of an intermediate audio signal using the spectral band of the first channel of the encoded audio signal and using the spectral band of the second channel of the encoded audio signal, and to generate a spectral band of a second channel of the intermediate audio signal using the spectral band of the first channel of the encoded audio signal and using the spectral band of the second channel of the encoded audio signal, if the mid-side encoding was used, and wherein the apparatus comprises a de-normalizer configured to modify, depending on a de-normalization value, at least one of the first channel and the second channel of the intermediate audio signal to acquire the first channel and the second channel of the decoded audio signal, wherein the decoding unit is configured to determine for each spectral band of the plurality of spectral bands, whether the spectral band of the first channel of the encoded audio signal and the spectral band of the second channel of the encoded audio signal was encoded using the dual-mono encoding or using the mid-side encoding, wherein the decoding unit is configured to acquire the spectral band of the second channel of the encoded audio signal by reconstructing the spectral band of the second channel, wherein, if the mid-side encoding was used, the spectral band of the first channel of the encoded audio signal is a spectral band of a mid signal, and the spectral band of the second channel of the encoded audio signal is spectral band of a side signal, wherein, if the mid-side encoding was used, the decoding unit is configured to reconstruct the spectral band of the side signal depending on a correction factor for the spectral band of the side signal and depending on a spectral band of a previous mid signal, which corresponds to the spectral band of the mid signal, wherein the previous mid signal precedes the mid signal in time.

36. A system for generating a decoded audio signal from an encoded audio signal, comprising:

a system for decoding an encoded audio signal comprising four or more channels to acquire four channels of a decoded audio signal comprising four or more channels, wherein the system for decoding is configured to generate the decoded audio signal from the encoded audio signal, wherein the system comprises a first apparatus for decoding the encoded audio signal to acquire a first channel and a second channel of the decoded audio signal, wherein the system comprises a second apparatus, wherein the first apparatus comprises a decoding unit configured to determine for each spectral band of a plurality of spectral bands, whether the spectral band of the first channel of the encoded audio signal and the spectral band of the second channel of the encoded audio signal was encoded using dual-mono encoding or using mid-side encoding, wherein the decoding unit is configured to generate a spectral band of a first channel of an intermediate audio signal using the spectral band of the first channel of the encoded audio signal and using the spectral band of the second channel of the encoded audio signal, and to generate a spectral band of the second channel of a intermediate audio signal using the spectral band of the first channel of the encoded audio signal and using the spectral band of the second channel of the encoded audio signal, if the mid-side encoding was used, and wherein the first apparatus comprises a de-normalizer configured to modify, depending on a de-normalization value, at least one of the first channel and the second channel of the intermediate audio signal to acquire the first channel and the second channel of the decoded audio signal, wherein the decoding unit is configured to determine for each spectral band of the plurality of spectral bands, whether the spectral band of the first channel of the encoded audio signal and the spectral band of the second channel of the encoded audio signal was encoded using the dual-mono encoding or using the mid-side encoding, wherein the decoding unit is configured to acquire the spectral band of the second channel of the encoded audio signal by reconstructing the spectral band of the second channel, wherein, if the mid-side encoding was used, the spectral band of the first channel of the encoded audio signal is a spectral band of a mid signal, and the spectral band of the second channel of the encoded audio signal is spectral band of a side signal, wherein, if the mid-side encoding was used, the decoding unit is configured to reconstruct the spectral band of the side signal depending on a correction factor for the spectral band of the side signal and depending on a spectral band of a previous mid signal, which corresponds to the spectral band of the mid signal, wherein the previous mid signal precedes the mid signal in time, wherein the second apparatus is configured for decoding a third channel and a fourth channel of the four or more channels of the encoded audio signal to acquire a third channel and a fourth channel of the decoded audio signal.

37. A method for encoding a first channel and a second channel of an audio input signal comprising two or more channels to acquire an encoded audio signal, the method comprising:

determining a first channel and a second channel of a normalized audio signal by modifying, depending on a normalization value, at least one of the first channel and the second channel of the audio input signal, generating a processed audio signal comprising a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal obtained by processing a spectral band of the first channel of the normalized audio signal and a spectral band of the second channel of the normalized audio signal, and such that at least one spectral band of the second channel of the processed audio signal is a spectral band of a side signal obtained by processing a spectral band of the first channel of the normalized audio signal and a spectral band of the second channel of the normalized audio signal, and encoding the processed audio signal to acquire the encoded audio signal.

38. A method for decoding an encoded audio signal comprising a first channel and a second channel to acquire a first channel and a second channel of a decoded audio signal comprising two or more channels, wherein the method comprises:

determining for each spectral band of a plurality of spectral bands, whether the spectral band of the first channel of the encoded audio signal and the spectral band of the second channel of the encoded audio signal was encoded using dual-mono encoding or using mid-side encoding, generating a spectral band of a first channel of an intermediate audio signal using the spectral band of the first channel of the encoded audio signal and using the spectral band of the second channel of the encoded audio signal, and generating a spectral band of a second channel of the intermediate audio signal using the spectral band of the first channel of the encoded audio signal and using the spectral band of the second channel of the encoded audio signal, when the mid-side encoding is used, and modifying, depending on a de-normalization value, at least one of the first channel and the second channel of the intermediate audio signal to acquire the first channel and the second channel of the decoded audio signal, wherein the method further comprises:

determining for each spectral band of the plurality of spectral bands, whether the spectral band of the first channel of the encoded audio signal and the spectral band of the second channel of the encoded audio signal was encoded using the dual-mono encoding or using the mid-side encoding, acquiring the spectral band of the second channel of the encoded audio signal by reconstructing the spectral band of the second channel, using the mid-side encoding, the spectral band of the first channel of the encoded audio signal is a spectral band of a mid signal, and the spectral band of the second channel of the encoded audio signal is spectral band of a side signal, and when using the mid-side encoding, the method comprises reconstructing the spectral band of the side signal depending on a correction factor for the spectral band of the side signal and depending on a spectral band of a previous mid signal, which corresponds to the spectral band of the mid signal, wherein the previous mid signal precedes the mid signal in time.

39. A non-transitory digital storage medium having a computer program stored thereon to perform a method for encoding a first channel and a second channel of an audio input signal comprising two or more channels to acquire an encoded audio signal, the method comprising:

determining a first channel and a second channel of a normalized audio signal by modifying, depending on a normalization value, at least one of the first channel and the second channel of the audio input signal, generating a processed audio signal comprising a first channel and a second channel, such that one or more spectral bands of the first channel of the processed audio signal are one or more spectral bands of the first channel of the normalized audio signal, such that one or more spectral bands of the second channel of the processed audio signal are one or more spectral bands of the second channel of the normalized audio signal, such that at least one spectral band of the first channel of the processed audio signal is a spectral band of a mid signal obtained by processing a spectral band of the first channel of the normalized audio signal and a spectral band of the second channel of the normalized audio signal, and such that at least one spectral band of the second channel of the processed audio signal is a spectral band of a side signal obtained by processing a spectral band of the first channel of the normalized audio signal and a spectral band of the second channel of the normalized audio signal, and encoding the processed audio signal to acquire the encoded audio signal, when the computer program is run by a computer or signal processor.

40. A non-transitory digital storage medium having a computer program stored thereon to perform the method for decoding an encoded audio signal comprising a first channel and a second channel to acquire a first channel and a second channel of a decoded audio signal comprising two or more channels, the method comprising:

determining for each spectral band of a plurality of spectral bands, whether the spectral band of the first channel of the encoded audio signal and the spectral band of the second channel of the encoded audio signal was encoded using dual-mono encoding or using mid-side encoding, generating a spectral band of a first channel of an intermediate audio signal using the spectral band of the first channel of the encoded audio signal and using the spectral band of the second channel of the encoded audio signal, and generating a spectral band of a second channel of the intermediate audio signal using the spectral band of the first channel of the encoded audio signal and using the spectral band of the second channel of the encoded audio signal, when the mid-side encoding is used, and modifying, depending on a de-normalization value, at least one of the first channel and the second channel of the intermediate audio signal to acquire the first channel and the second channel of the decoded audio signal, wherein the method further comprises:

determining for each spectral band of the plurality of spectral bands, whether the spectral band of the first channel of the encoded audio signal and the spectral band of the second channel of the encoded audio signal was encoded using the dual-mono encoding or using the mid-side encoding, acquiring the spectral band of the second channel of the encoded audio signal by reconstructing the spectral band of the second channel, wherein, if the mid-side encoding was used, the spectral band of the first channel of the encoded audio signal is a spectral band of a mid signal, and the spectral band of the second channel of the encoded audio signal is spectral band of a side signal, wherein, if the mid-side encoding was used, the method comprises reconstructing the spectral band of the side signal depending on a correction factor for the spectral band of the side signal and depending on a spectral band of a previous mid signal, which corresponds to the spectral band of the mid signal, wherein the previous mid signal precedes the mid signal in time, when the computer program is run by a computer or signal processor.

* * * * *